United States Patent
Sato

(10) Patent No.: US 7,667,587 B2
(45) Date of Patent: *Feb. 23, 2010

(54) DATA COMMUNICATIONS APPARATUS, DATA COMMUNICATIONS SYSTEM AND DATA COMMUNICATIONS METHOD

(75) Inventor: Yasuhiro Sato, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 365 days.

This patent is subject to a terminal disclaimer.

(21) Appl. No.: 11/626,611

(22) Filed: Jan. 24, 2007

(65) Prior Publication Data

US 2007/0171088 A1 Jul. 26, 2007

(30) Foreign Application Priority Data

Jan. 26, 2006 (JP) ............................. 2006-017797
Nov. 10, 2006 (JP) ............................. 2006-305430

(51) Int. Cl.
*G08B 26/00* (2006.01)

(52) U.S. Cl. ........................ 340/500; 340/506; 340/612; 340/613

(58) Field of Classification Search ................. 340/500, 340/506, 612, 613, 666, 825.36, 825.49
See application file for complete search history.

(56) References Cited

U.S. PATENT DOCUMENTS

| | | | |
|---|---|---|---|
| 6,361,136 B1* | 3/2002 | Watanabe et al. ............... | 347/7 |
| 2007/0113644 A1* | 5/2007 | Manaka et al. ........... | 73/204.26 |
| 2007/0135717 A1* | 6/2007 | Uenishi et al. ............... | 600/485 |
| 2008/0154518 A1* | 6/2008 | Manaka et al. ................ | 702/24 |

FOREIGN PATENT DOCUMENTS

| | | |
|---|---|---|
| JP | 2005-159821 | 6/2005 |
| JP | 2005-216318 | 8/2005 |

OTHER PUBLICATIONS

Ken Hinckley, "Synchronous Gestures for Multiple Persons and Computers", UIST 2003 Symposium on User Interface Software and Technology, Nov. 4, 2003, 10 pages.

* cited by examiner

*Primary Examiner*—Daryl Pope
(74) *Attorney, Agent, or Firm*—Oblon, Spivak, McClelland, Maier & Neustadt, L.L.P.

(57) ABSTRACT

A data communications apparatus for communicating with another apparatus is disclosed. The data communications apparatus includes: a physical amount detection unit configured to detect changes of a first physical amount caused by contact with the another apparatus; a physical amount receiving unit configured to receive a signal including change information of a second physical amount of the another apparatus detected in the another apparatus when the first physical amount detected by the physical amount detection unit exceeds a predetermined value; a physical amount comparing unit configured to compare the changes of the first physical amount with the changes of the second physical amount to determine presence or absence of similarity; and a communication establishment unit configured to establish a communication with the another apparatus when the physical amount comparing unit determines that there is a similarity between the changes of the first physical amount and the changes of the second physical amount.

20 Claims, 23 Drawing Sheets

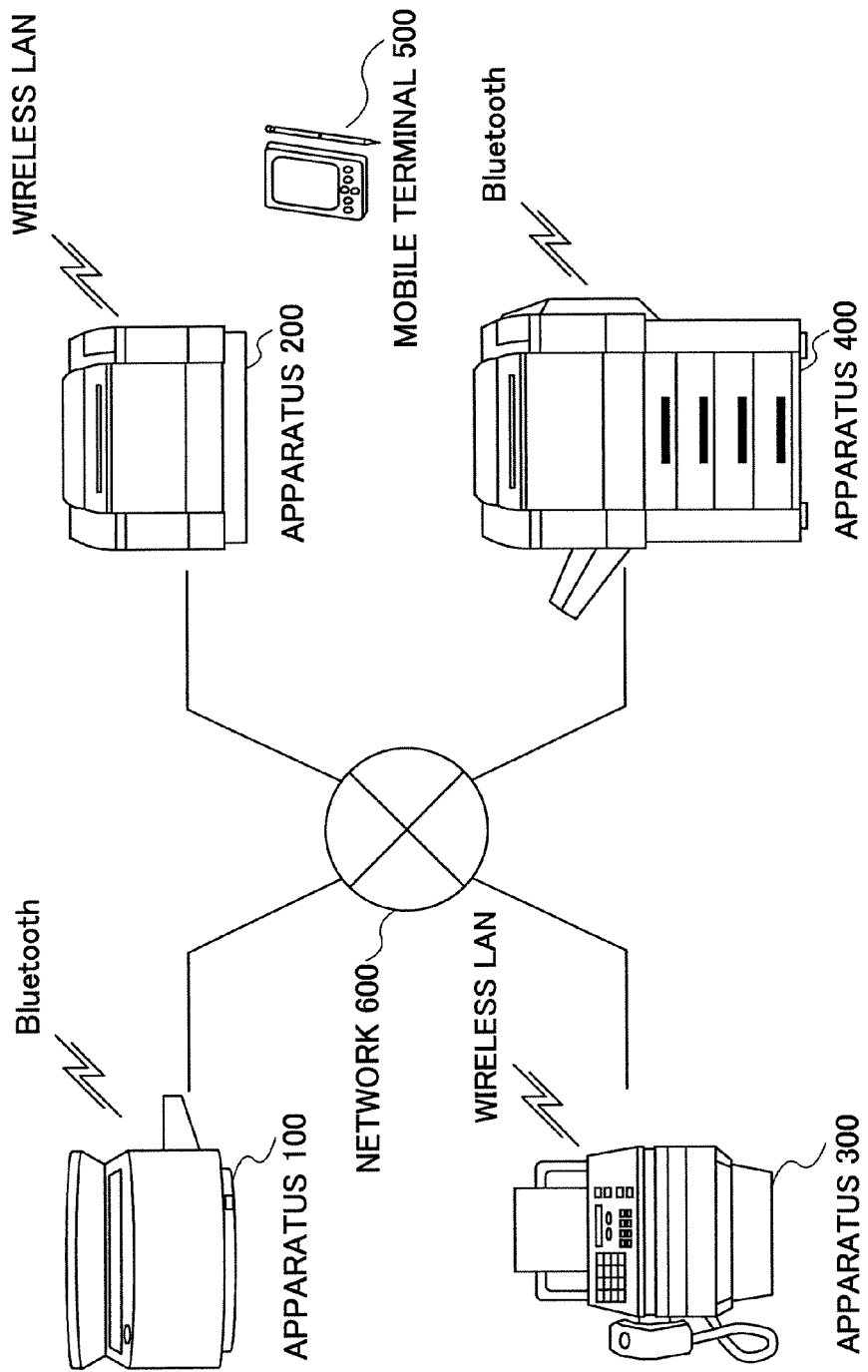

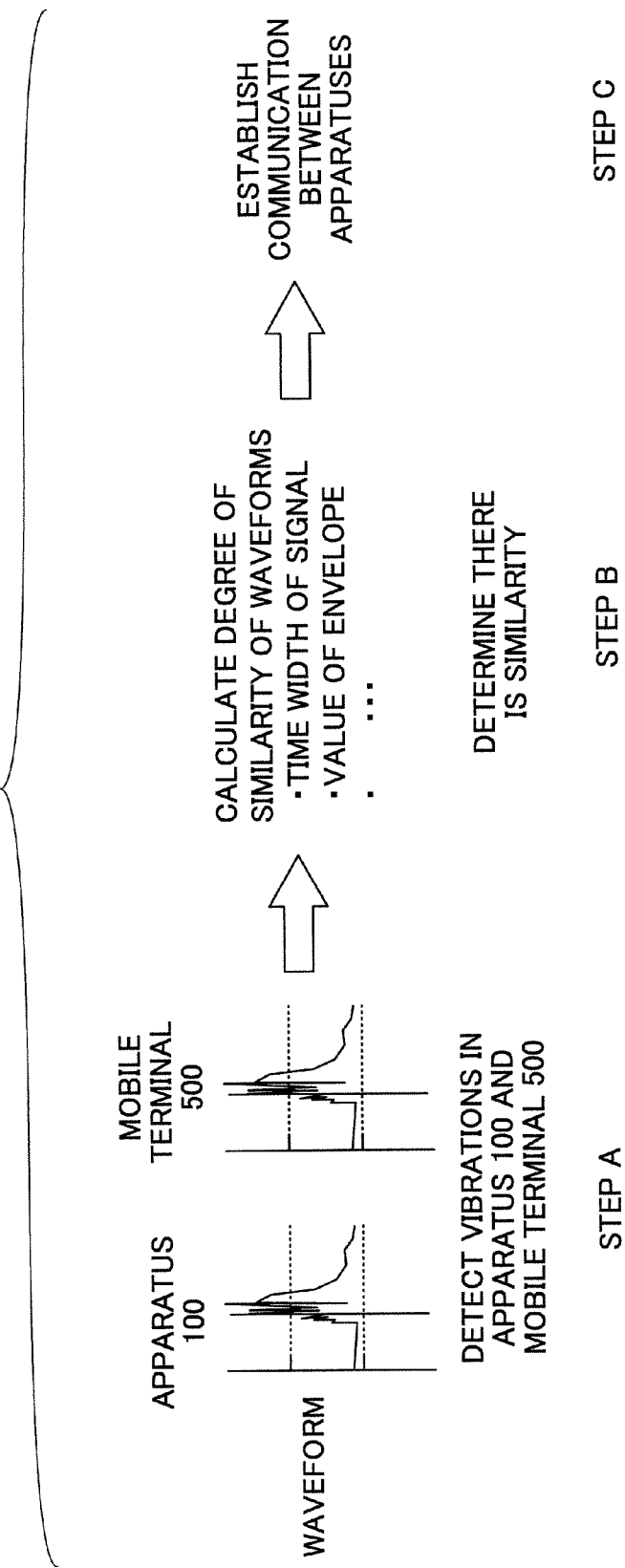

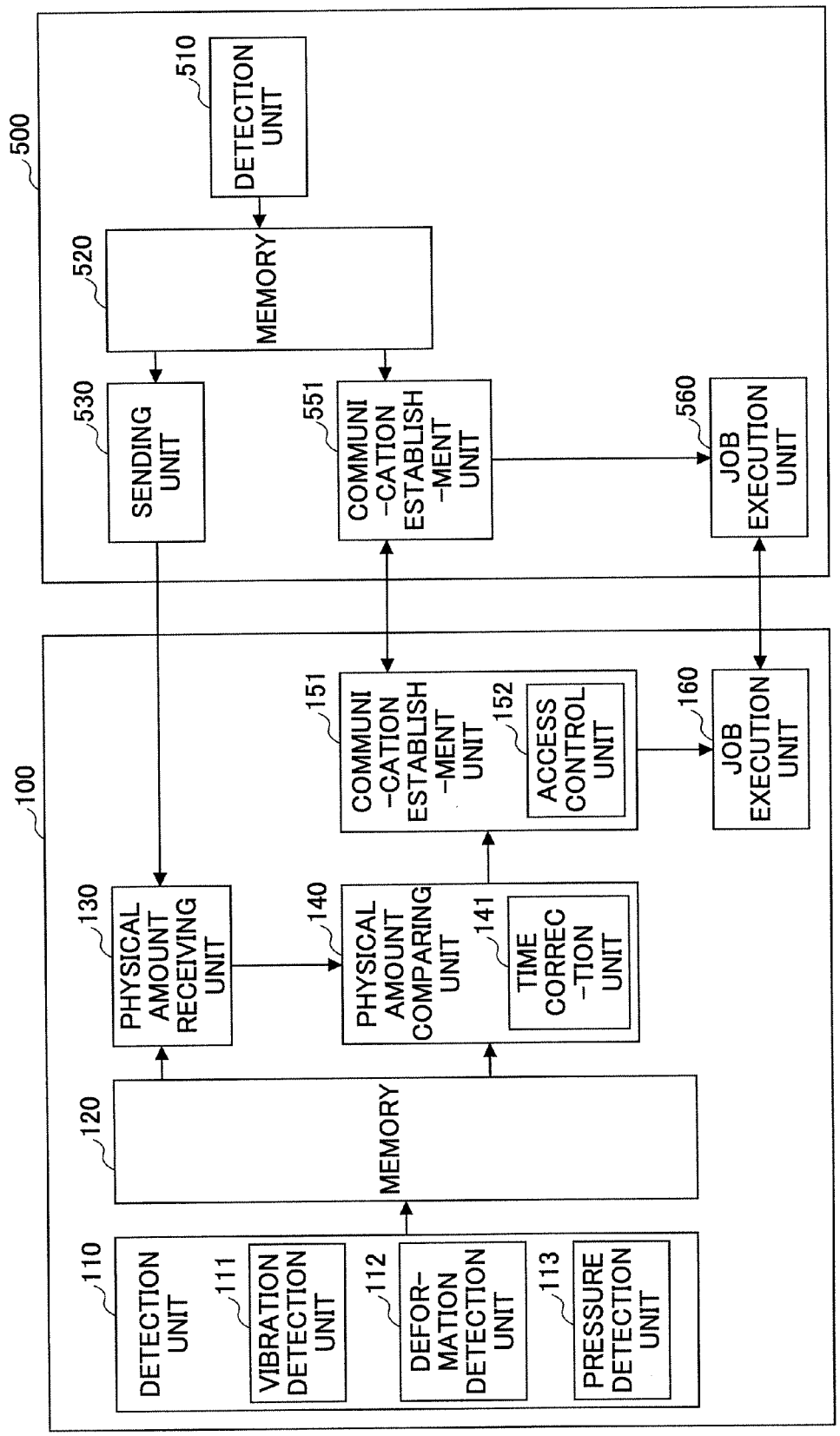

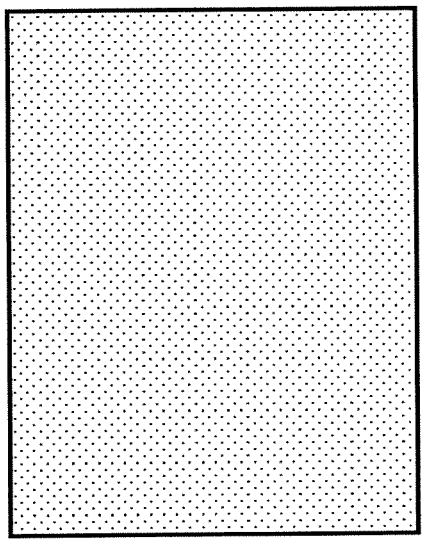
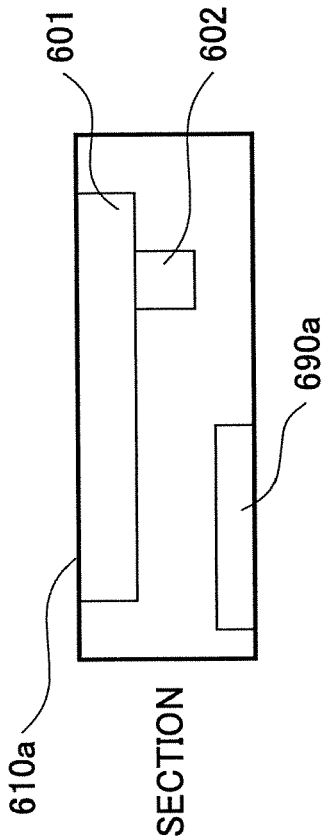
FIG.11A — SURFACE WHICH ANOTHER APPARATUS CONTACTS
FIG.11B — CROSS SECTION

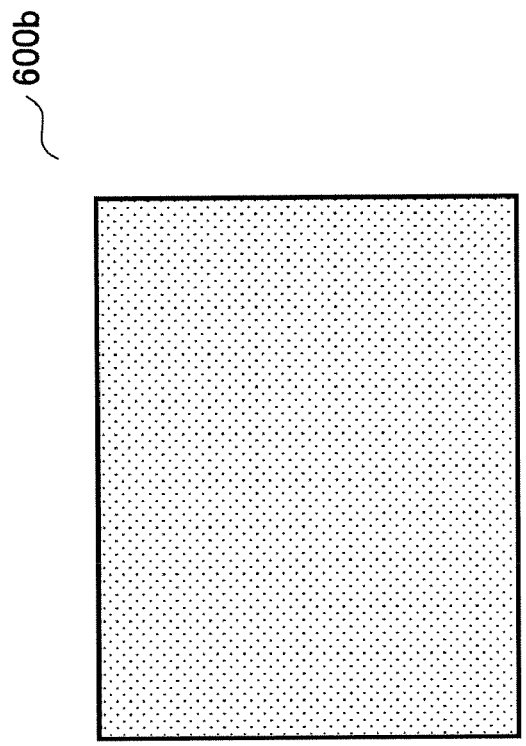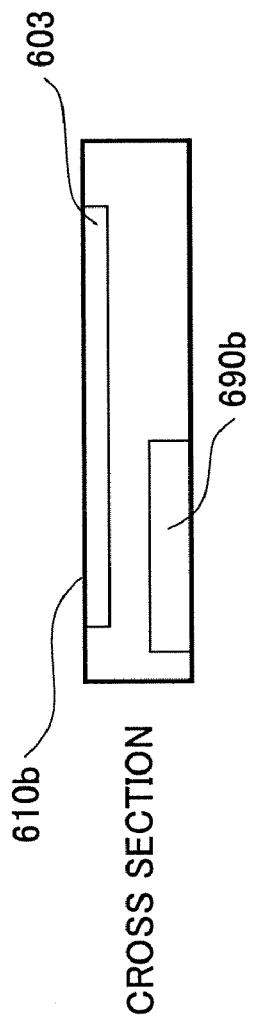

SURFACE WHICH ANOTHER APPARATUS CONTACTS

CROSS SECTION

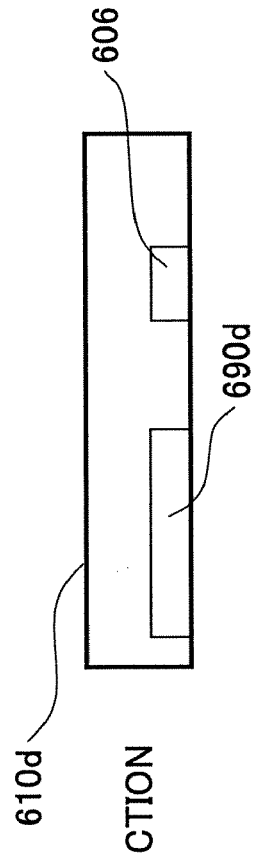
FIG.14A  SURFACE WHICH ANOTHER APPARATUS CONTACTS
FIG.14B  CROSS SECTION

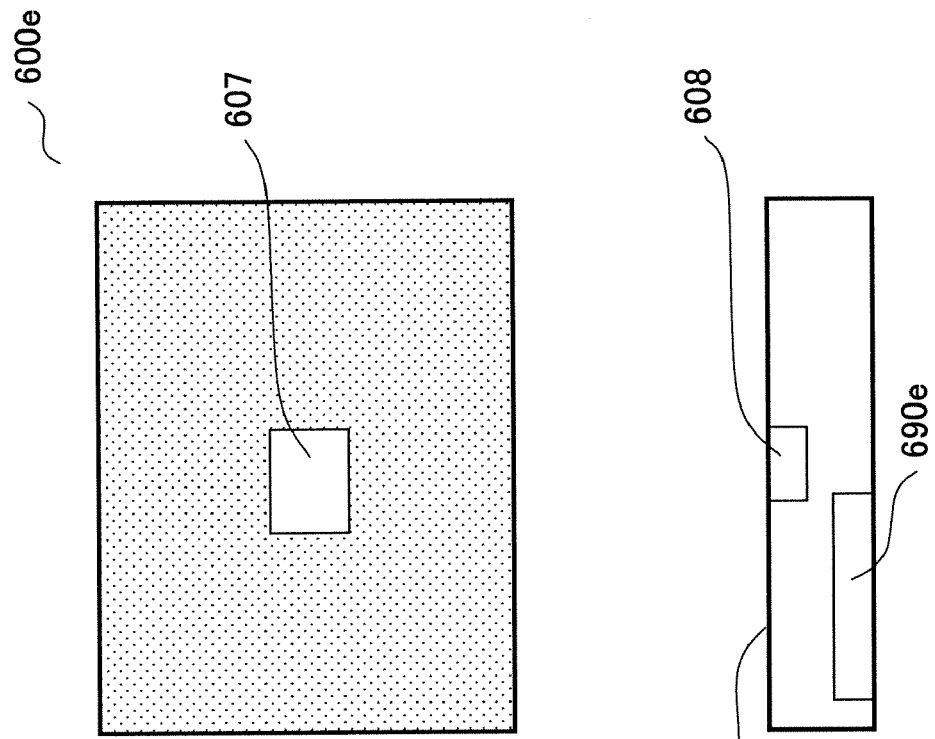

SURFACE WHICH ANOTHER APPARATUS CONTACTS

600f

CROSS SECTION 609
610f
690f (a1)    (a2)

(b1)    (b2)

(c1)    (c2)

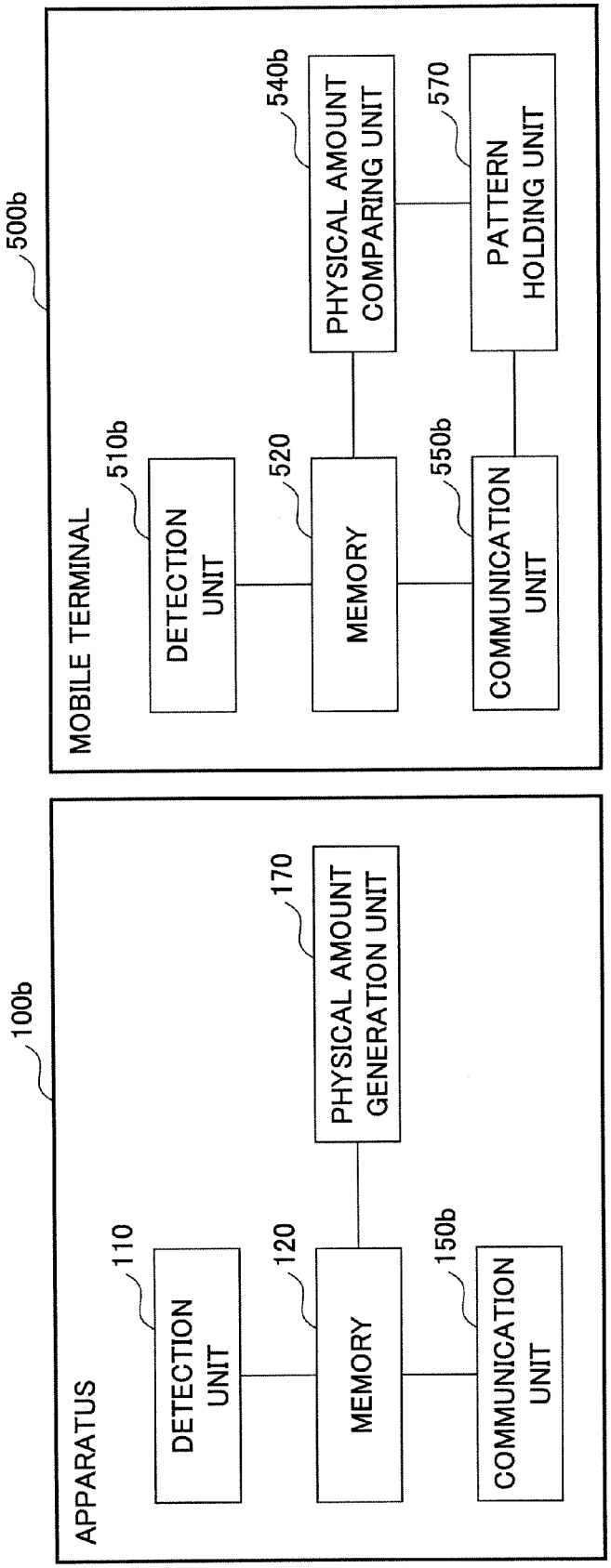

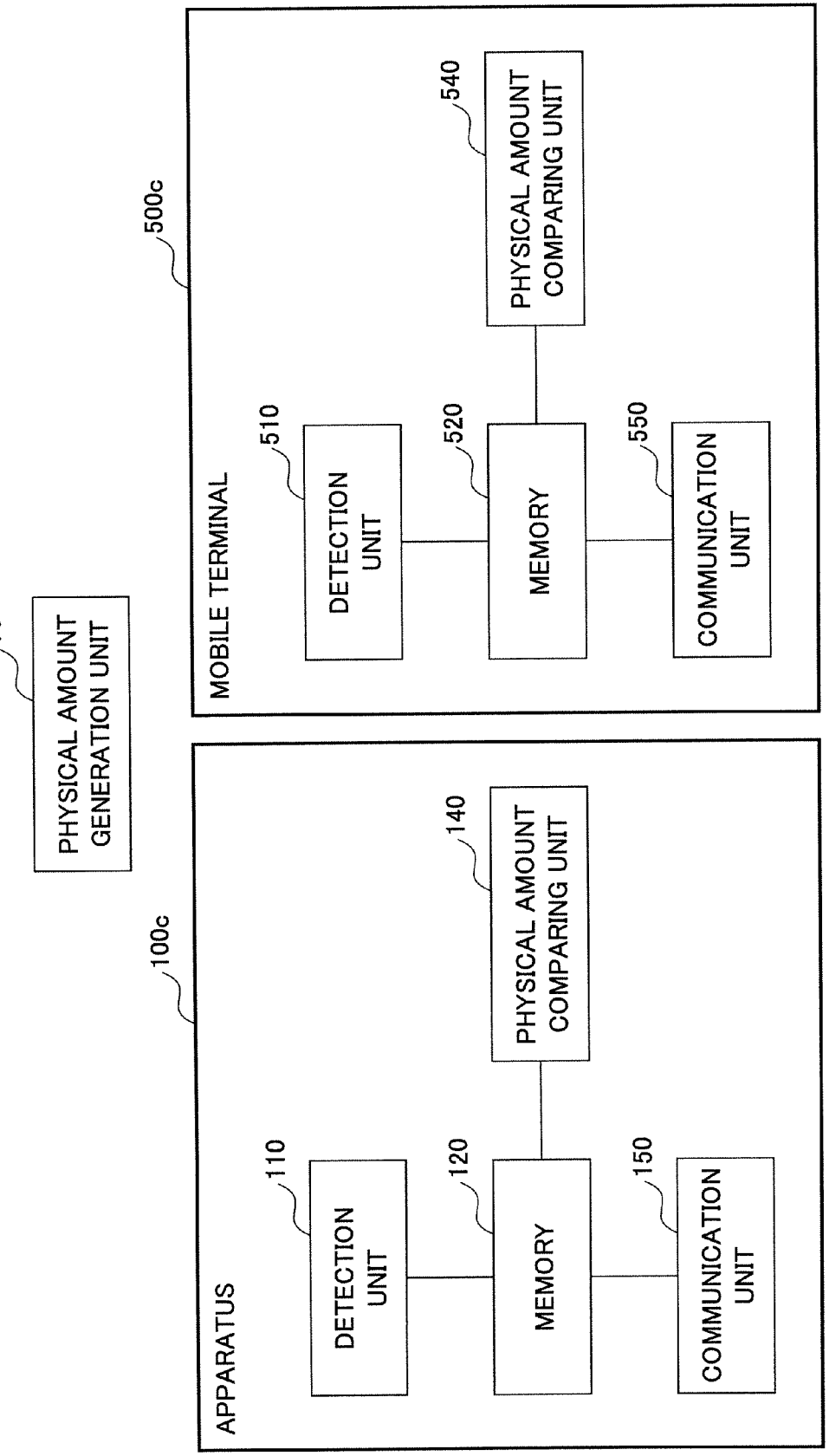

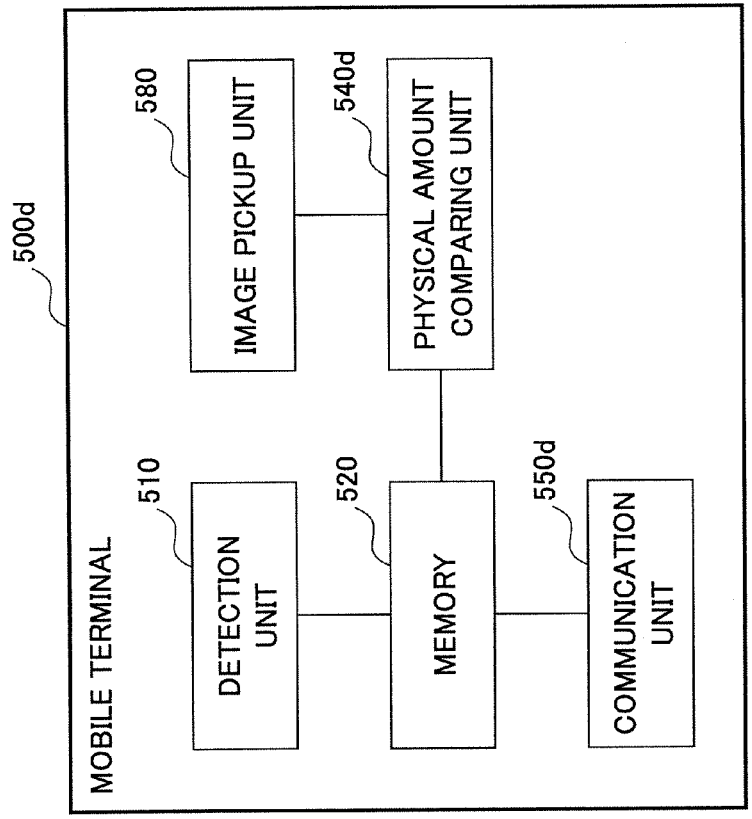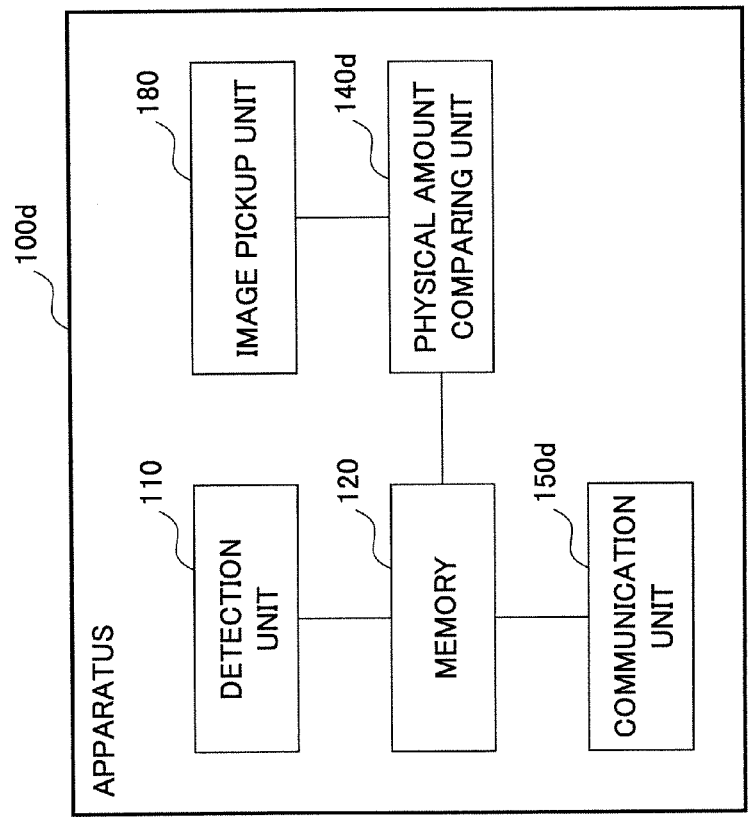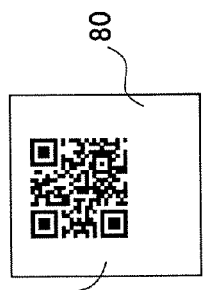

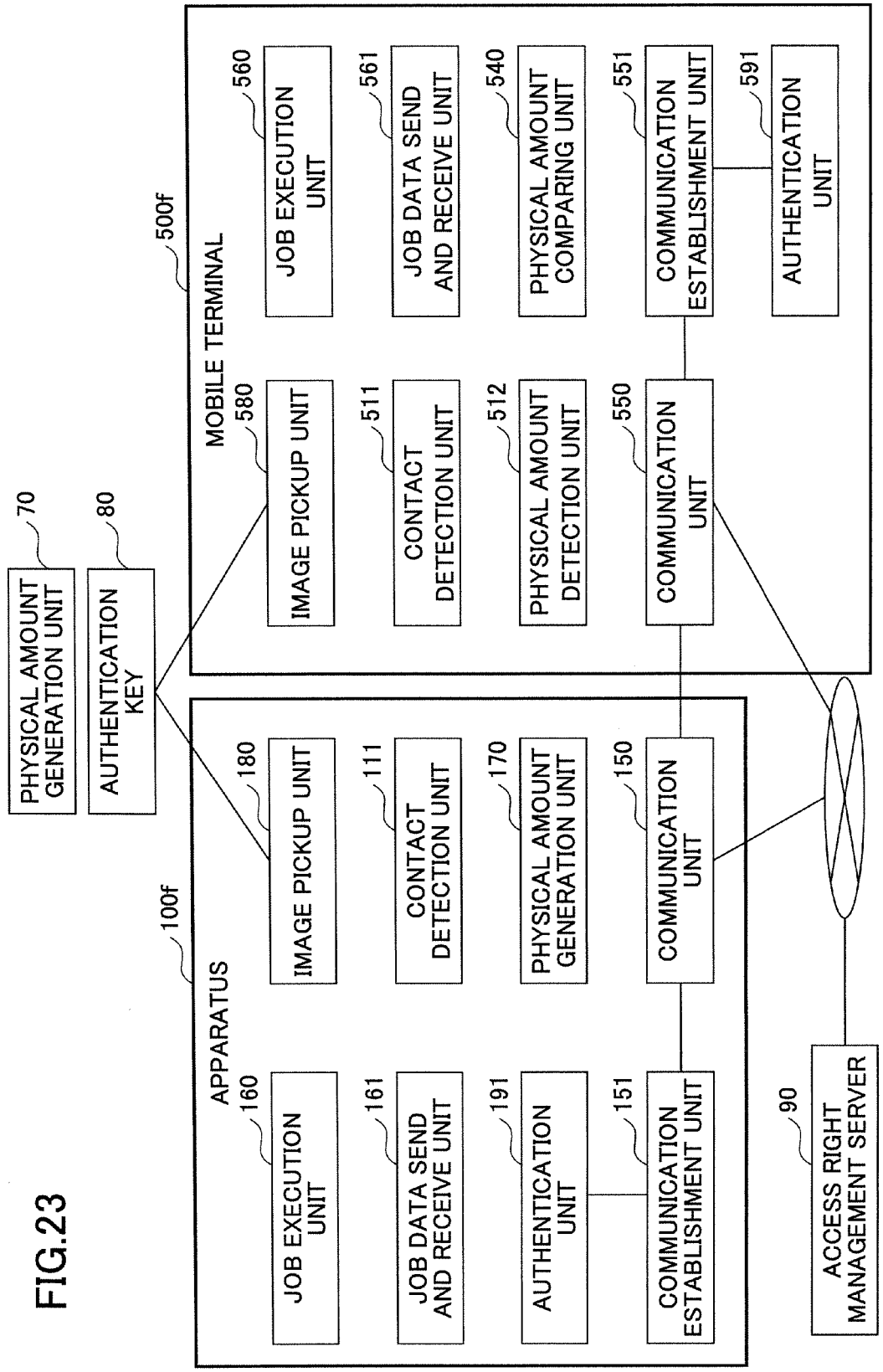

DATA COMMUNICATIONS APPARATUS, DATA COMMUNICATIONS SYSTEM AND DATA COMMUNICATIONS METHOD

BACKGROUND OF THE INVENTION

1. Field of the Invention

The present invention relates to a data communications apparatus, a data communications system and a data communications method.

2. Description of the Related Art

From the past, there has been a data communications technique for establishing a communication between apparatuses in which an operator sets an identification number and an access condition for each apparatus. For example, in wireless LAN defined by IEEE802.11, the operator sets ESS-ID (Extended Service Set Identifier) for each apparatus so that communications are established among apparatuses having the same ESS-ID for sending and receiving data among the apparatuses. Therefore, when an apparatus is newly connected to an existing network, it is necessary for the operator to check beforehand identification numbers such as ESS-IDs and access conditions of apparatuses already connected to the network.

By the way, as defined in the IEEE802.11, ESS-ID of an apparatus already connected to a network can be obtained by setting "ESS-ID" to be "ANY". Thus, there is an apparatus that displays a list of apparatuses to which the apparatus can connect on a display device of the apparatus when there are a plurality of apparatuses having different ESS-IDs. The operator selects an apparatus from the list for establishing a connection to the selected apparatus.

The list displayed by the apparatus includes ESS-IDs of each apparatus or names of each apparatus on the network or the like. Thus, it is necessary to manage correspondences between actual apparatuses and the names or the like on the network, and to compare the names or the like displayed on the list with the actual apparatuses for designating an apparatus connection. Therefore, a complicated procedure is required.

In addition, since ESS-IDs of connectable apparatuses can be obtained by setting ESS-ID of an apparatus that will connect to the network to be "ANY", a third party can access apparatuses easily so that there is a problem in that it becomes difficult to ensure security by performing access control. Following documents may relate to this application.

[Patent Document 1] Japanese Laid-Open Patent Application No. 2005-159821

[Non-Patent Document 1] Ken Hinckley (Microsoft Research), "Synchronous Gestures for Multiple Persons and Computers", Nov. 4, 2003, UIST2003 (Annual ACM (Association for Computing Machinery) Symposium on User Interface Software and Technology 2003).

The patent document 1 discloses a communications apparatus for communicating with another apparatus. The communications apparatus obtains, from each of a plurality of communications apparatuses that is a candidate of a communication destination, movement information indicating movements in a space of the communications apparatuses, and displays the movement information. The user selects one of displayed movement images so that the communication apparatus communicates with a communication apparatus indicated by the selected movement image.

The non-patent document 1 discloses tablet PCs each having a multiaxial acceleration sensor. The tablet PC is a personal computer including a wireless communication unit and a pen inputting unit, and is small so as to be carried easily. The acceleration sensor detects contact with another tablet PC and direction of the contact so that each tablet PC changes content form displayed on a screen of the tablet PC.

However, as to the communications apparatus disclosed in the patent document 1, since the operator selects another communications apparatus to communicate with based on the movement information of the plurality of communications apparatuses each being a candidate of a communication destination, the operator needs to visually compare movement of the communications apparatuses in an actual space with movement information displayed on the screen.

In addition, according to the tablet PC disclosed in the non-patent document 1, the acceleration sensor is used for controlling application and the like among tablet PCs in which communications are already established. But, it is not considered to establish a communication or to perform communication control such as access control.

SUMMARY OF THE INVENTION

An object of the present invention is to provide a data communications apparatus for associating physical contact between apparatuses with communication establishment so that a communication can be easily established and good operability is obtained.

The object can be achieved by a data communications apparatus for communicating with another apparatus, including:

a physical amount detection unit configured to detect changes of a first physical amount caused by contact of the another apparatus;

a physical amount receiving unit configured to receive a signal including change information of a second physical amount that is detected by the another apparatus when the first physical amount detected by the physical amount detection unit exceeds a predetermined value;

a physical amount comparing unit configured to compare the changes of the first physical amount detected by the physical amount detection unit with the changes of the second physical amount detected by the another apparatus to determine presence or absence of similarity;

a communication establishment unit configured to establish a communication with the another apparatus when the physical amount comparing unit determines that there is a similarity between the changes of the first physical amount and the changes of the second physical amount.

The data communications apparatus may include:

a sending unit configured to send a signal including change information of the first physical amount when the first physical amount detected by the physical amount detection unit exceeds a predetermined value, wherein the communication establishment unit establishes a communication with the another apparatus when the another apparatus requests establishment of the communication.

Also, the data communications apparatus may include:

a contact detection unit configured to detect contact with the another apparatus;

a physical amount changing unit configured to change a predetermined physical amount of the data communications apparatus according to a predetermined pattern when the contact detection unit detects contact with the another apparatus, wherein the communication establishment unit establishes a communication with the another apparatus when the another apparatus that detects changes of the predetermined physical amount requests establishment of the communication.

Further, the data communications apparatus may include:

a contact detection unit configured to detect contact with the another apparatus;

a detection unit configured to detect changes of a physical amount generated by the another apparatus when the contact detection unit detects contact with the another apparatus; and a physical amount determination unit configured to determine whether the changes of the physical amount generated by the another apparatus include a predetermined pattern, wherein the communication establishment unit establishes a communication with the another apparatus when the physical amount determination unit determines that the changes of the physical amount generated by the another apparatus include the predetermined pattern.

According to an embodiment, a data communications system including a first data communications apparatus and a second data communications apparatus that communicate with each other can be provided. In the data communications system, the first data communications apparatus may include:

a detection unit configured to detect changes of a first physical amount caused by contact with the second data communications apparatus;

a physical amount receiving unit configured to receive a signal including change information of a second physical amount that is detected by the second communications apparatus when the first physical amount detected by the detection unit exceeds a predetermined value;

a physical amount comparing unit configured to compare the changes of the first physical amount detected by the detection unit with the changes of the second physical amount received by the physical amount receiving unit to determine presence or absence of similarity; and a communication establishment unit configured to establish a communication with the second data communications apparatus when the physical amount comparing unit determines that there is a similarity between the changes of the first physical amount and the changes of the second physical amount, and the second data communications apparatus may include:

a detection unit configured to detect the changes of the second physical amount caused by contact with the first data communications apparatus;

a sending unit configured to send a signal including the change information of the second physical amount when the second physical amount exceeds a predetermined value; and a communication establishment unit configured to establish a communication with the first data communications apparatus when the first data communications apparatus requests establishment of a communication based on the changes of the second physical amount.

Also, a data communications method in a data communications apparatus for communicating with another apparatus can be provided. The data communications method may include:

a physical amount detection step of detecting changes of a first physical amount caused by contact of the another apparatus;

a physical amount receiving step of receiving a signal including change information of a second physical amount that is detected by the another apparatus when the first physical amount detected in the physical amount detection step exceeds a predetermined value;

a physical amount comparing step of comparing the changes of the first physical amount detected in the physical amount detection step with the changes of the second physical amount received in the physical amount receiving step to determine presence or absence of similarity;

a communication establishing step of establishing a communication with the another apparatus when it is determined that there is a similarity between the changes of the first physical amount and the changes of the second physical amount in the physical amount comparing step.

According to the data communications apparatus of the present invention, a communication can be easily established and good operability is obtained by associating physical contact between apparatuses with communication establishment.

BRIEF DESCRIPTION OF THE DRAWINGS

Other objects, features and advantages of the present invention will become more apparent from the following detailed description when read in conjunction with the accompanying drawings, in which:

FIG. 1 shows a network configuration in which data communications apparatuses of an embodiment of the present invention are connected;

FIG. 3 is a figure for explaining the process for comparing the first physical amount with the second physical amount;

FIG. 4 shows another example of functional configurations of the apparatus 100 and the mobile terminal 500;

FIGS. 11A and 11B show a communication establishment unit including an acceleration sensor;

FIGS. 12A and 12B a communication establishment unit including a pressure-sensitive sheet;

FIGS. 14A and 14B a communication establishment unit including a directional microphone;

FIGS. 15A and 15B a communication establishment unit including a light sensor;

FIGS. 18A and 18B respectively show an example of a data communications apparatus of an embodiment of the present invention in which an apparatus 100b includes a physical amount generation unit;

FIG. 20 shows a data communications system of an embodiment of the present invention in which a physical amount generation unit is provided outside the apparatuses;

FIGS. 21A-21C show an example of functional configurations of data communications apparatuses of an embodiment of the present invention in which an image pickup unit is provided;

FIG. 23 shows another example of a functional configuration of a data communications system of an embodiment of the present invention.

DETAILED DESCRIPTION OF THE PREFERRED EMBODIMENTS

In the following, embodiments of the present invention are described with reference to figures.

First Embodiment

FIG. 1 shows a network configuration in which data communications apparatuses of an embodiment of the present invention are connected. As shown in FIG. 1, apparatuses 100-400 and a mobile terminal 500 each of which is an embodiment of the data communications apparatus of the present invention are connected to each other via a network 600. Each of the apparatuses 100-400 includes one or more functions of a printer, a facsimile, a scanner, and a server. In addition, each of the apparatuses 100-400 includes an interface of Bluetooth or IEEE802.11 or the like as an interface for wireless communications.

Each of the apparatuses 100-400 may be connected to the network 600 by wireless or by cable based on IEEE802.3. In addition, the network 600 may include access points (not shown in the figure) so that each of the apparatuses 100-400 may connect to another apparatus via the access points.

As to the apparatuses 100-400, since the apparatuses 100-400 include same features, the apparatus 100 is described in the following.

The mobile terminal 500 includes an interface for wireless communications, and can connect to the apparatus 100 directly or via the network to communicate with the apparatus 100. For example, the mobile terminal 500 is an apparatus including at least one of functions of a mobile phone, a scheduler, a scanner, a mailer, and a digital camera and the like. The interface for wireless communications included in the mobile terminal 500 is the Bluetooth or the IEEE802.11, for example.

Figure 2A:
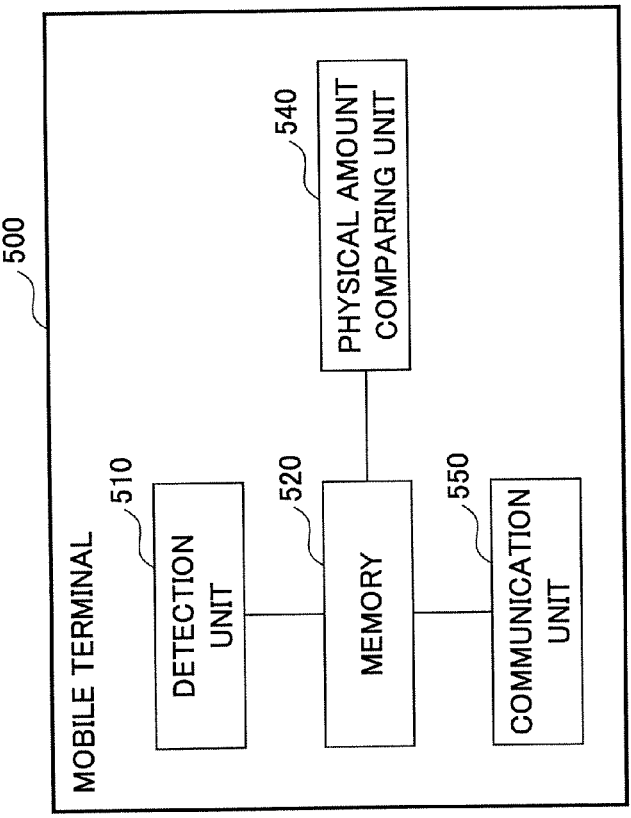
FIG. 2A shows a functional configuration example of an apparatus 100.

FIG. 2A shows a functional configuration of the apparatus 100 that is a data communications apparatus for establishing a communication with a mobile terminal and the like that contacts the data communications apparatus based on detection of a physical amount caused by vibration and the like. As shown in FIG. 2A, the apparatus 100 includes a detection unit 110, a memory 120, a physical amount comparing unit 140 and a communication unit 150.

The detection unit 110 is a sensor and the like for detecting a physical amount caused by vibration and the like. The memory 120 is a recording medium for storing the detected physical amount. The physical amount comparing unit 140 compares a first physical amount detected by the detection unit 110 with a second physical amount received by the communication unit 150 to determine presence or absence of similarity between them.

The communication unit 150 is a unit for performing communications with another apparatus directly or via a network. When the physical amount comparing unit 140 determines that there is a similarity between the first physical amount and the second physical amount or between changes of the first physical amount and changes of the second physical amount, the communication unit 150 established a communication.

To establish a communication means to set communications apparatuses to be in a state in which they can send and receive instruction of a job or in which they can send and receive data for executing a job. In a stage called "pre-communication" that is a stage before establishing a communication, it is possible to send and receive only limited signals.

Figure 2B:
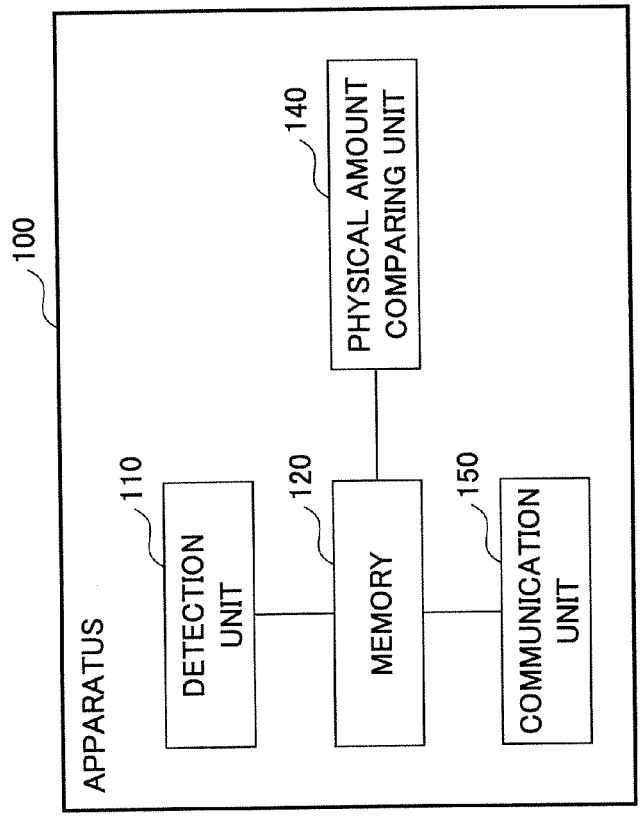
FIG. 2B shows a functional configuration example of a mobile terminal 500.

FIG. 2B shows a functional configuration of the mobile terminal 500 that is also a data communications apparatus for establishing a communication with an apparatus and the like that contacts with the data communications apparatus based on detection of a physical amount caused by vibration and the like.

As shown in FIG. 2B, the mobile terminal 500 includes a detection unit 510, a memory 520, a physical amount comparing unit 540 and a communication unit 550.

The detection unit 510 is a sensor and the like for detecting a physical amount caused by vibration and the like. The memory 520 is a recording medium for storing the detected physical amount. The physical amount comparing unit 540 compares a second physical amount detected by the detection unit 510 with a first physical amount received by the communication unit 550 to determine presence or absence of similarity between them.

The communication unit 550 is a unit for performing communications with another apparatus directly or via the network. When the physical amount comparing unit 540 determines that there is a similarity between the first physical amount and the second physical amount or between changes of the first physical amount and changes of the second physical amount, the communication unit 550 establishes a communication.

As shown in FIGS. 2A and 2B, the apparatus 100 and the mobile terminal 500 have the same configuration in this embodiment. But, the data communications apparatus of this invention is not limited to them. For example, the mobile terminal 500 may not include the physical amount comparing unit 540 so as to send a detected physical amount to the apparatus 100 using the communication unit 550 so that the apparatus 100 compares physical amounts.

FIG. 3 is a figure for explaining the process for comparing the first physical amount with the second physical amount. In step A, vibrations are detected in each of the apparatus 100 and the mobile terminal 500. In step A, FIG. 3 shows a waveform representing values of the first physical amount detected by the apparatus 100 and a waveform representing values of the second physical amount detected by the mobile terminal 500. In each graph of the waveforms in FIG. 3, the lateral axis indicates time. As shown in each graph, the physical amount changes as time passes.

In step B, the physical amount comparing unit 140 or 540 calculates degree of similarity of the waveforms. More particularly, a half-width of the peak of each waveform or a value of an envelope of each waveform or the like is calculated. In step C, when the physical amount comparing unit 140 or 540 determines that each of the waveform of the first physical amount and the waveform of the second physical amount is greater than a predetermined value and that the first physical amount and the second physical amount have similarity, the communication units 150 and 550 establish a communication between the apparatus 100 and the mobile terminal 500.

FIG. 4 shows an example of functional configurations of the apparatus 100 and the mobile terminal 500 that are different from those shown in FIGS. 2A and 2B. As shown in FIG. 4, the apparatus 100 is connected to the mobile terminal 500 via a network or directly. A communication between the apparatus 100 and the mobile terminal 500 is established by detecting physical amounts of vibration and the like caused when the apparatus 100 and the mobile terminal 500 contact each other, for example.

The apparatus 100 includes a detection unit 110, a memory 120, a physical amount receiving unit 130, physical amount comparing unit 140, a communication establishment unit 151, and a job execution unit 160.

The detection unit 110 detects a first physical amount caused by contact and the like between the apparatus 100 and the mobile terminal 500, and stores the first physical amount into the memory 120 when the first physical amount is greater than a predetermined value. The detection unit 110 includes a vibration detection unit 111, a deformation detection unit 112, and a pressure detection unit 113. Instead of having all of the units, the detection unit 110 may include one or more of the vibration detection unit 111, the deformation detection unit 112, and the pressure detection unit 113.

The vibration detection unit 111 is an acceleration sensor, a gyro sensor (angular velocity sensor) or the like, and the vibration detection unit 111 can be configured to have either of single axis and multiple axes. When the vibration detection unit 111 is configured as a multiaxial angular velocity sensor or gyro sensor, the first physical amount is a waveform showing temporal change of a resultant vector of physical amounts of each axis direction. A waveform may show a temporal change of a physical amount from a time when change of the physical amount exceeds a predetermined value to a time when change of the physical amount becomes smaller than the predetermined value.

The deformation detection unit 112 is a circuit having a strain gauge, for example. The deformation detection unit 112 may be configured to be provided on a surface of a material that forms a case of the apparatus 100. The strain gauge detects strain in the material forming the case of the apparatus 100 which strain is caused by contact between the apparatus 100 and the mobile terminal 500.

Figure 5:
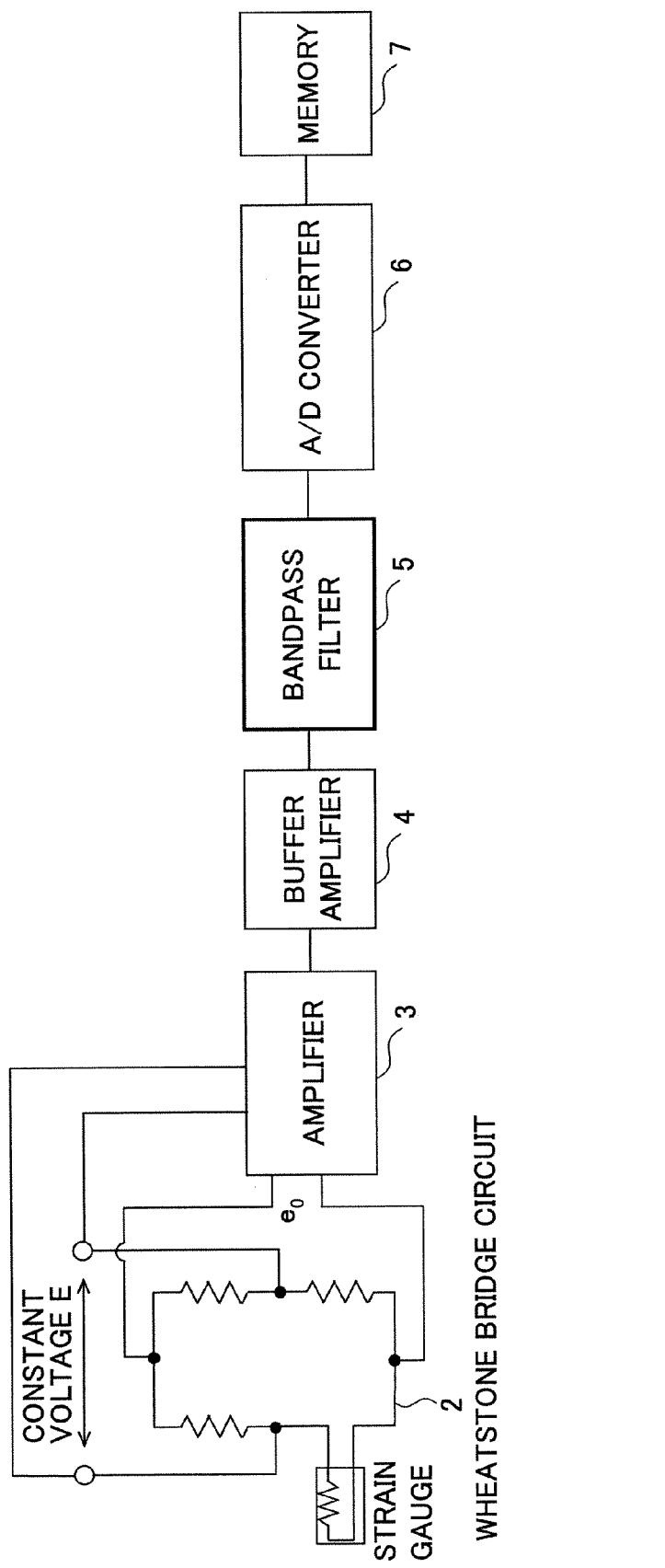
FIG. 5 shows an example of a deformation detection unit.

FIG. 5 shows a circuit for amplifying and sampling the signal detected by the strain gauge, and after that, storing the signal into the memory 120. As shown in FIG. 5, the deformation detection unit 112 includes a strain gauge 1, a Wheatstone bridge circuit 2, an amplifier 3, a buffer amplifier 4, a bandpass filter 5, and an A/D converter 6.

The strain gauge 1 is provided on a surface of a material forming the case of the apparatus 100. Changes of electrical resistance occur in the strain gauge 1 due to deformation of the surface. The Wheatstone bridge circuit 2 converts the changes of the resistance of the strain gauge 1 to a voltage. The amplifier 3 amplifies the voltage, and the buffer amplifier 4 adjusts impedance. After that, the bandpass filter 5 performs sampling. The A/D converter converts an analog signal of the sampled voltage into a digital signal.

As the pressure detection unit 113, a pressure-sensitive sensor having a pressure-sensitive conductive rubber and the like is provided at a part where changes of load occur due to contact between the apparatus 100 and the mobile terminal 500.

The memory 120 is a recording medium for storing the first physical amount detected by the detection unit 110. The physical amount receiving unit 130 receives a signal including the second physical amount from the mobile terminal 500 and sends the signal to the physical amount comparing unit 140.

The physical amount comparing unit 140 compares the first physical amount stored in the memory 120 with the second physical amount received by the physical amount receiving unit 130 so as to determine presence or absence of similarity between them or similarity between changes of them.

By the way, there may a case where there is a difference between the time of the first physical amount detected by the detection unit 110 and the detection time of the second physical amount received by the physical amount receiving unit. Therefore, the physical amount comparing unit 140 may includes a time correcting unit 141 for correcting time when comparing the first physical amount with the second physical amount. For example, the detection time of the first physical amount may be different from the detection time of the second physical amount when the mobile terminal 500 contacts a utensil and the like on which the apparatus 100 is placed instead of the apparatus 100 directly contacting the mobile terminal 500.

When the vibration detection unit 111 is configured to be a multiaxial angular velocity sensor or a gyro sensor, the physical amount comparing unit 140 calculate degree of similarity between waveforms showing temporal changes of the first physical amount and the second physical amount. Cross-correlation coefficients are used for the calculation of the degree of similarity, for example. When the vibration detection unit 111 includes a uniaxial angular velocity sensor or gyro sensor, the first physical amount is determined as a time width of the waveform detected by the sensor or a value of half-width of the peak.

The communication establishment unit 151 establishes a communication with the mobile terminal 500 when the physical amount comparing unit 140 determines that there is a similarity between the first physical amount and the second physical amount or between the changes of the first physical amount and the changes of the second physical amount. The communication establishment unit 151 also includes an access control unit 152 and the communication establishment unit 151 may perform access control for limiting access to the apparatus 100 based on identification information assigned to the mobile terminal 500 and the like when a communication is established.

After the communication with the mobile terminal is established, the job execution unit 160 executes a job based on an instruction from the mobile terminal 500, or sends and receives data necessary for the job based on an instruction from the mobile terminal 500. The instruction of the job or data necessary for the job may be received with the second physical amount from the mobile terminal 500 instead of receiving the job or the data after the communication is established.

When the physical amount caused by contact with the apparatus 100 is greater than a predetermined value, the mobile terminal 500 sends the physical amount to the apparatus 100 to establish a communication. The mobile terminal 500 includes a detection unit 510, a memory 520, a sending unit 530, a communication establishment unit 551, and a job execution unit 560.

The detection unit 510 has a configuration almost the same as that of the detection unit 110. The detection unit 510 detects the second physical amount caused by contact and the like between the apparatus 100 and the mobile terminal 500. Then, when the second physical amount is greater than a predetermined value, the detection unit 510 stores the second physical amount into the memory 520. The memory 520 is a recording medium for storing the second physical amount detected by the detection unit 510. The sending unit 530 sends a signal including the second physical amount to the apparatus 100.

When the communication establishment unit 151 in the apparatus 100 to which the sending unit 530 sends the signal including the second physical amount requests the communication establishment unit 551 to establish a communication, the communication establishment unit 551 establishes a communication between the apparatus 100 and the mobile terminal 500.

After the communication between the apparatus 100 and the mobile terminal 500 is established, the job execution unit 560 executes the job according to the instruction from the apparatus 100, or sends and receives data necessary for the job.

Figure 6:
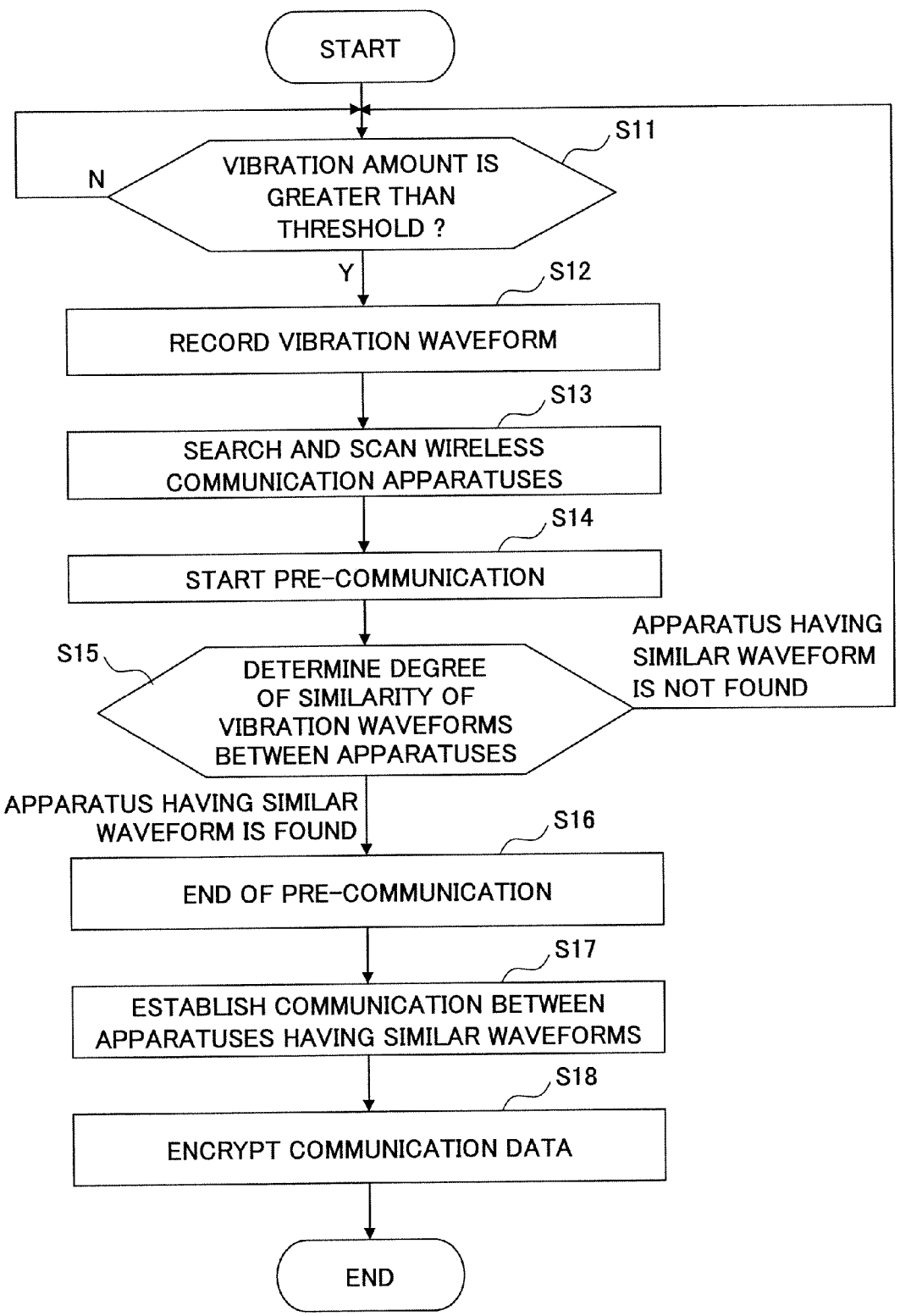
FIG. 6 shows a flowchart showing a process for establishing a communication based on the detected physical amount and starting send and receive of encrypted data.
Figure 7:
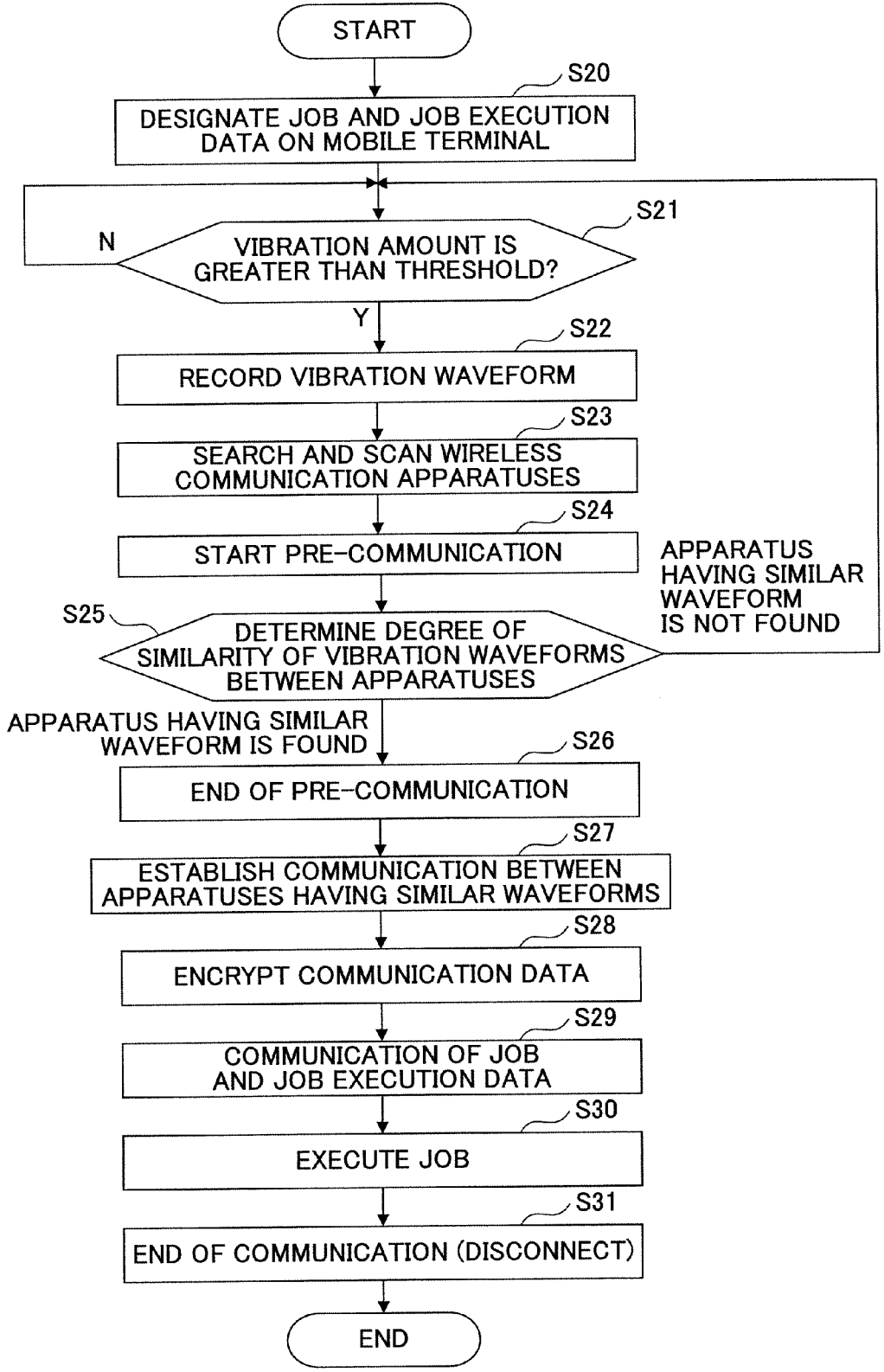
FIG. 7 is a flowchart for explaining operation, of the data communications apparatus of an embodiment of the present invention, in which the data communications apparatus establishes a communication and executes a job that is received previously.
Figure 8:
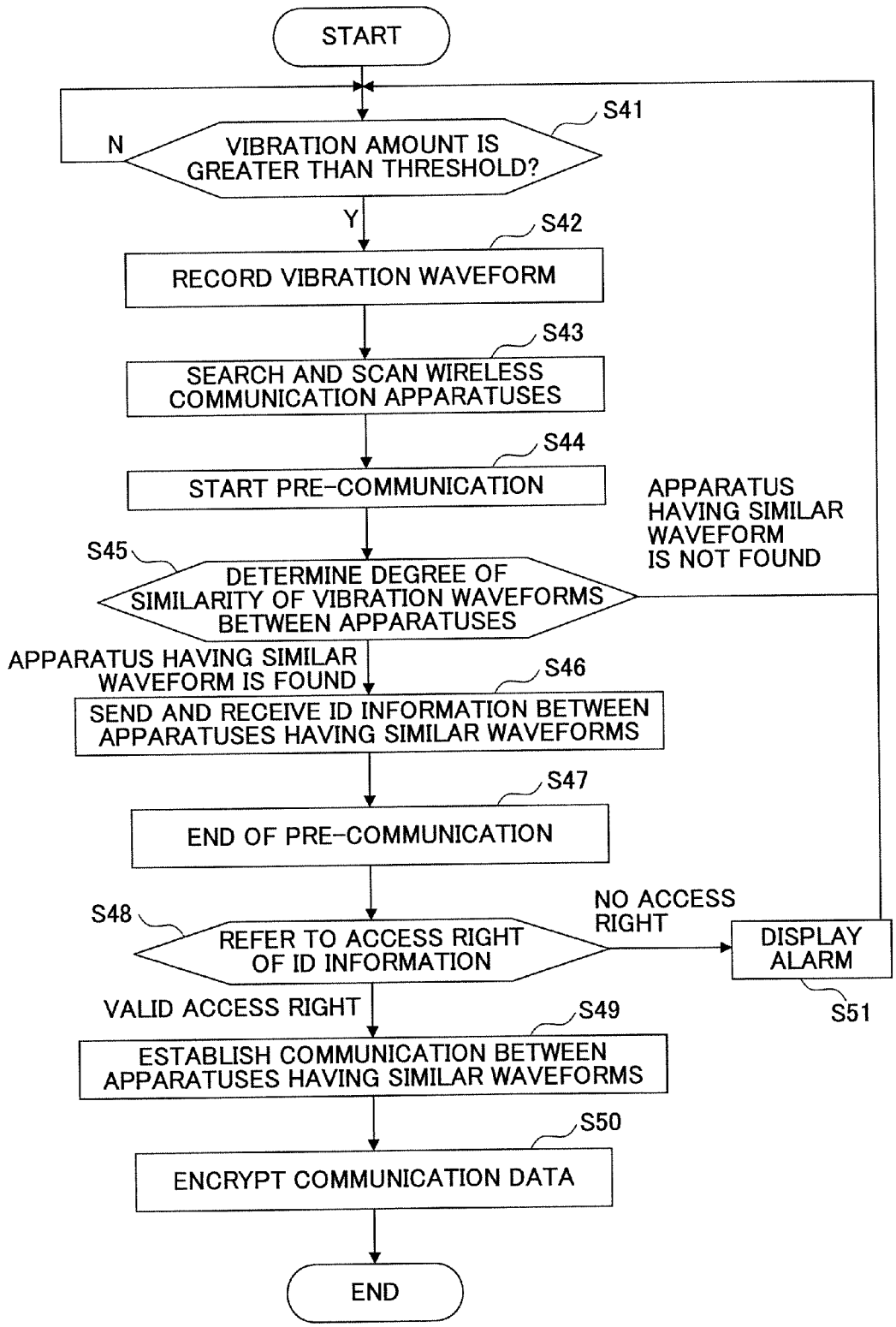
FIG. 8 shows a flowchart of operation of the data communications apparatus of an embodiment of the present invention in which the data communications apparatus performs access control.

FIGS. 6-8 show flowcharts for explaining a process flow of the data communications apparatus of an embodiment of the present invention.

FIG. 6 shows a flowchart showing a process for establishing a communication based on the detected physical amount and starting send and receive of encrypted data. In step S11, the detection unit 110 detects the first physical amount. For example, the detection unit 110 detects acceleration or angular velocity or the like caused by vibration. Then, the detection unit 110 determines whether the physical amount is greater than a predetermined value. When it is greater than the predetermined value, the process goes to step S12 regarding the physical amount to be the first physical amount. When the physical amount is no greater than the predetermined value, the process of step S11 is repeated.

In step S12, the memory 120 stores the first physical amount detected by the detection unit 110.

In step S13, the physical amount receiving unit 130 searches and scans wireless communications apparatuses residing around the apparatus 100. In step S14, the apparatus 100 starts pre-communication with an apparatus of the wireless communications apparatuses residing around the apparatus 100 so as to receive a signal including the second physical amount from the apparatus.

In step S15, the physical amount comparing unit 140 compares the first physical amount detected by the detection unit 110 with the second physical amount received by the physical amount receiving unit 130. For example, when the physical amount is one caused by vibration caused by contact, the physical amount comparing unit 140 determines degree of similarity of waveforms of acceleration or waveforms of angular velocity. When the waveforms are similar so that it is determined that the first physical amount and the second physical amount have a similarity, the process goes to step S16. When it is not determined that the first physical amount and the second physical amount have similarity, the process goes to step S11. By the way, when it is not determined that the first physical amount and the second physical amount have similarity, the process may go to step S11 after ending the pre-communication.

In step S16, the physical amount receiving unit 130 ends the pre-communication. In step S17, the communication establishment unit 151 establishes a communication between the apparatus 100 and the mobile terminal 500 that is the apparatus that sent the second physical amount.

In step S18, the job execution unit 160 receives encrypted data from the mobile terminal 500, and sends data to the mobile terminal 500 after encrypting the data.

FIG. 7 is a flowchart for explaining operation, different from one shown in FIG. 6, of the data communications apparatus of an embodiment of the present invention, in which the data communications apparatus establishes a communication and executes a job that is received previously.

In step S20, using an inputting unit of the mobile terminal 500, the mobile terminal 500 receives an instruction of execution of a job and/or data used for executing the job. The data used when executing the job may be stored in a recording medium in the mobile terminal 500.

Processes from step S21 to step S28 are the same as processes from step S11 to step S18 shown in FIG. 6.

In step S29, the job execution unit 160 receives an instruction for executing a job which instruction is input into the mobile terminal 500 in step S20. The job execution unit 160 may receive data input to the mobile terminal 500 in step S20.

In step S30, the job execution unit 160 executes the job according to the instruction for executing the job received in step S29.

In step S31, after the job execution unit 160 completes the job, the communication establishment unit 151 disconnects the communication with the mobile terminal 500.

The job that is input into the mobile terminal in step S20 and that is executed by the job execution unit 160 in step S30 is a job such as printing, facsimile sending, or mail sending or the like. Data used when executing the job is a facsimile number of a sending destination, a mail address of a sending destination or document data for printing and the like.

FIG. 8 shows a flowchart of operation, which is different from those shown in FIGS. 6 and 7, of the data communications apparatus of an embodiment of the present invention in which the data communications apparatus performs access control.

Processes from step S41 to step S45 are the same as processes from step S11 to step S15 shown in FIG. 6.

In step S46, the access control unit 152 receives an identification number of the mobile terminal 500 so as to set access control information and store the information. The access control information may be stored in the apparatus 100 beforehand. The identification number of the mobile terminal 500 is a MAC (Media Access Control) address of a network card of the mobile terminal 500, for example.

In step S47, the physical amount receiving unit 130 ends the pre-communication.

In step S48, the access control unit 152 refers to the stored access control information of the mobile terminal 500. When the mobile terminal 500 has an access right, the process goes to step S49. When the mobile terminal 500 does not have the access right, the process goes to step S41. When the mobile terminal 500 does not have the access right, the process may go to step S51, then, after displaying information indicating that it does not have access right, the process may go to step S41.

In step S49, the communication establishment unit 151 establishes a communication between the apparatus 100 and the mobile terminal 500. In step S50, the job execution unit 160 receives encrypted data from the mobile terminal 500, and sends data to the mobile terminal after encrypting the data.

Second Embodiment

Figure 9B:
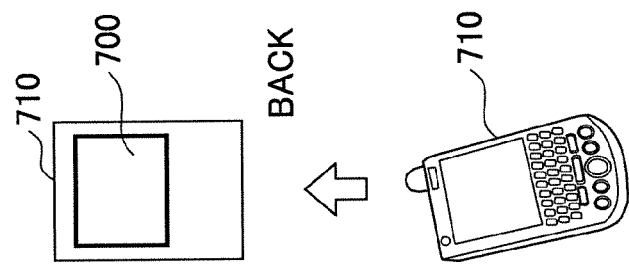
FIGS. 9A and 9B are figures for explaining a data communications system of an embodiment of the present invention.
Figure 9A:
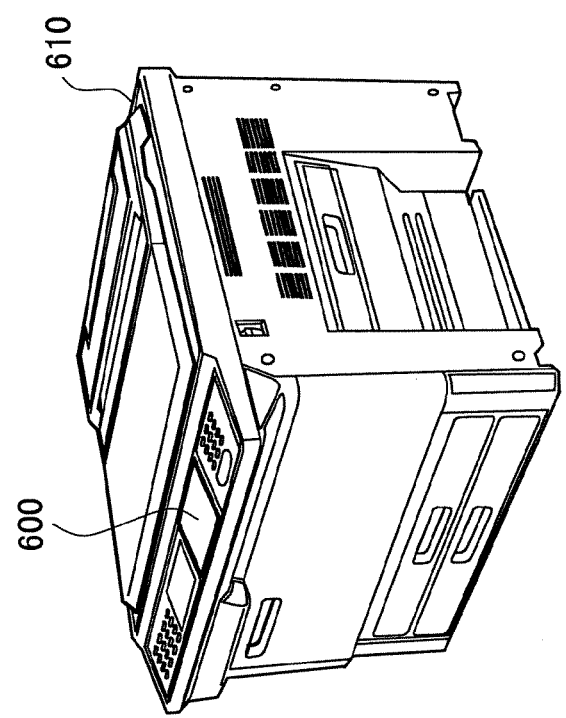

FIGS. 9A and 9B are figures for explaining a data communications system of an embodiment of the present invention. As shown in FIGS. 9A and 9B, a communication establishment unit 600 is provided on an upper surface of a copying machine 610, and a communication establishment unit 700 is provided on a back side of a mobile terminal 710. The communication establishment unit 600 is detachably connected to the copying machine 610 and the communication establishment unit 700 is detachably connected to the mobile terminal 710. For example, each of them can be easily attached by a user or a system adopter.

It is desirable that an interface between the communication establishment unit 600 and the copying machine 610 and an interface between the communication establishment unit 700 and the mobile terminal 710 are based on cable. Each of them may be configured to use an electrically detachable unit such as a connector, for example.

When the interface between the communication establishment unit 600 and the copying machine 610 or the interface between the communication establishment unit 700 and the mobile terminal 710 is based on wireless, the power source of the communication establishment unit can be a battery, or wire connection may be used only for supplying power.

The interface may be USB (Universal Serial Bus), IEEE1394, or PCI and the like. It is more desirable that power is supplied to the communication establishment unit 600 or 700 by a power line of the interface.

Figure 10B:
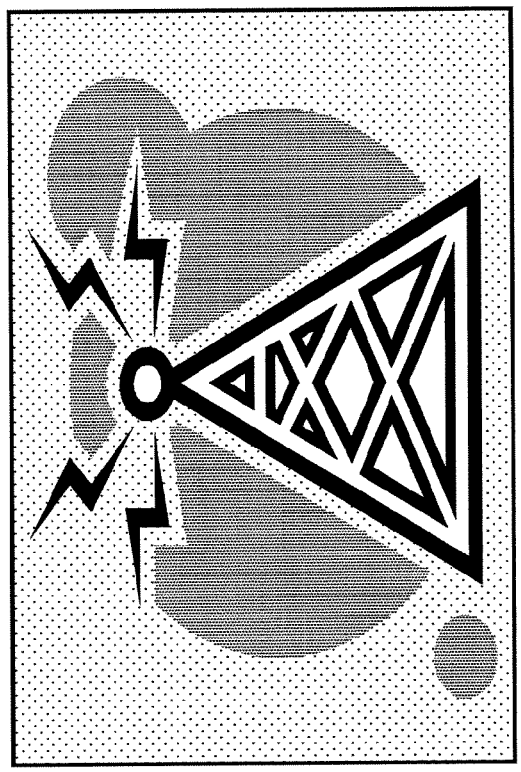
FIGS. 10A and 10B are figures for explaining characters, color, pattern or the like on the surface of the communication establishment unit.
Figure 10A:
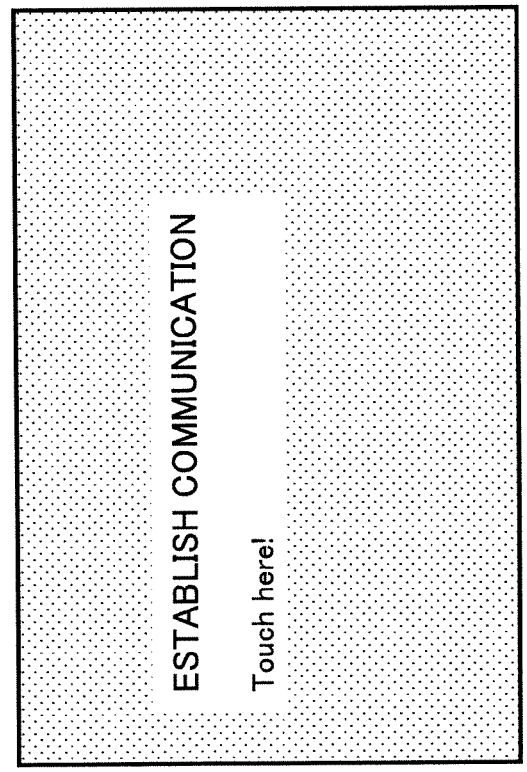

FIGS. 10A and 10B are figures for explaining characters, color, pattern or the like on the surface of the communication establishment unit. FIG. 10A shows characters, and FIG. 10B shows a pattern. According to the characters or the pattern, the operator can easily understand a place with which the operator brings another apparatus into contact for establishing a communication with the another apparatus. By the way, it is only necessary that the surface of the communication establishment unit or the place for establishing a communication can be visually recognized by an operator. For example, the surface or the place may be have a color different from that of other parts of the copying machine or the mobile terminal 710.

FIGS. 11A-16B are figures for explaining a structure of the communication establishment unit that is a data communications apparatus of an embodiment of the present invention. As shown in FIG. 9, for example, the communication establishment unit is detachably connected to an apparatus such as the copying machine 610 or the mobile terminal 710.

Each of FIGS. 11A, 12A, 13A, 14A, 15A and 16A shows a surface, of the communication establishment unit, with which another apparatus contact. Each of FIGS. 11B, 12B, 13B, 14B, 15B and 16B shows a cross section of the communication establishment unit. Each communication unit (600a-600f) is detachably connected to the copying machine 610 or the mobile terminal 710 and the like, and includes an interface (690a-690f) for receiving and passing data communicated with another apparatus, and a detection unit and a communication unit that are not shown in the figure. Other configurations are described below. In the following descriptions, "touch surface" indicates the surface with which another apparatus is brought into contact.

The communication establishment unit 600a shown in FIGS. 11A and 11B includes a rigid body 601 and an acceleration sensor 602. The rigid body 601 is for conveying vibration and the like on the surface of the communication establishment unit 600a to the acceleration sensor 602. For example, the rigid body 601 is comprised of a metal. The acceleration sensor 602 detects a physical amount or changes of the physical amount caused by the vibration and the like on the surface of the communication establishment unit 600a.

In the configuration shown in FIGS. 11A and 11B, the rigid body 601 is provided for efficiently detecting vibration caused by contact of another apparatus with the touch surface. But, when the material of the touch surface is a rigid body, the acceleration sensor 602 can be attached on the touch surface directly without providing the rigid body 601.

The communication establishment unit 600b shown in FIGS. 12A and 12B is provided with a pressure-sensitive sheet 603 on the surface of the touch surface. By bringing another apparatus into contact with the pressure-sensitive sheet 603, changes of pressure can be detected. The pressure-sensitive sheet 603 may be a resistance pressure-sensitive film, a pressure-sensitive conductive rubber, a capacitance type touch panel and the like.

Figure 13A:
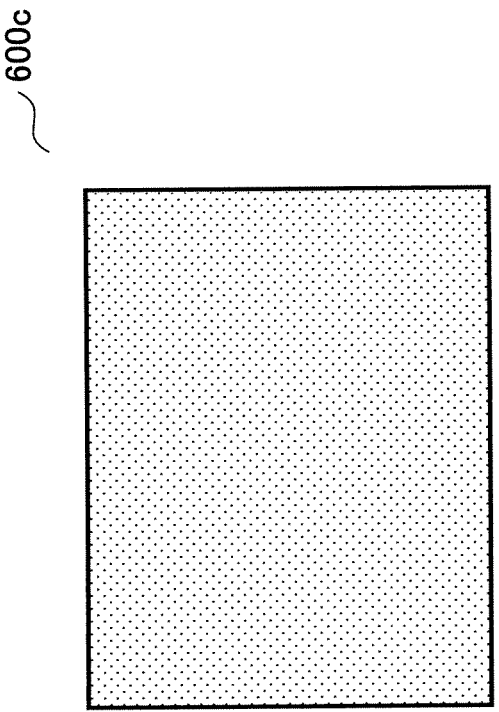
FIGS. 13A and 13B a communication establishment unit including a strain gauge.
Figure 13B:
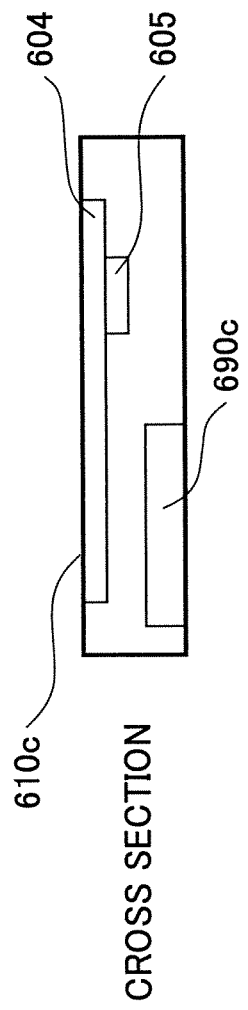

The communication unit 600c shown in FIGS. 13A and 13B includes a rigid body 604 and a strain gauge 605. The rigid body 604 is comprised of a metal, for example, that is slightly deformed due to contact of another apparatus to the touch surface. The strain gauge 605 detects the slight deformation of the rigid body 604. The strain gauge 605 is shaped like a foil, for example, and is stuck to the rigid body 604. The circuit of the strain gauge 605 may have a configuration the same as that shown in FIG. 5.

The communication establishment unit 600d shown in FIGS. 14A and 14B includes a directional microphone 606. The directional microphone 606 is a unit for detecting air vibration (sound pressure) due to contact sound that is caused by contact of an apparatus with the touch surface. The directional microphone 606 may be a dynamic microphone such as a piezo-electric microphone or a capacitor microphone or the like. It is desirable that the directional microphone 606 is small, light in weight, and thin so that it can be provided in the inside of the communication establishment unit 600d.

The communication establishment unit 600e shown in FIGS. 15A and 15B includes a light sensor 608, and is provided with a transparent window 607 that is optically transparent on the touch surface. When another apparatus contacts the touch surface, light is prohibited from entering the light sensor 608 through the transparent window 607 by the body of the another apparatus. The optical sensor 608 in the communication establishment unit 600e detects the interception of the light.

Figure 16A:
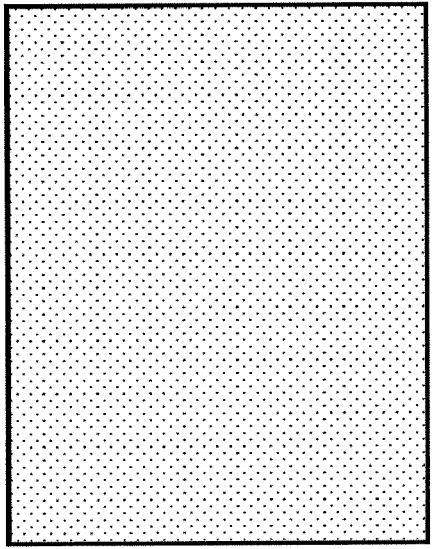
FIGS. 16A and 16B a communication establishment unit including a temperature sensor.
Figure 16B:
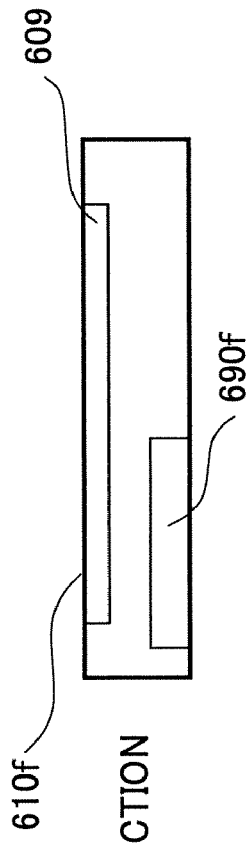

The communication establishment unit 600f shown in FIGS. 16A and 16B includes a temperature sensor 609. The temperature sensor 609 is a unit for detecting temperature changes when another apparatus contacts the touch surface. The temperature sensor 609 is a thin-film temperature sensor like a platinum foil or a thermocouple or the like, for example. The temperature sensor 609 is provided on a surface of the communication establishment unit 600f, and detects temperature changes caused by contact of another apparatus.

The physical amount detection unit may be any one of the communication establishment units described with reference to FIGS. 11A-16B. But, when it is required that the physical amount detection unit is light in weight and small, the acceleration sensor or the strain gauge may be used, and when necessity that the physical amount detection unit is light in weight and small is small, the optical sensor or the microphone may be used.

Figure 17A:
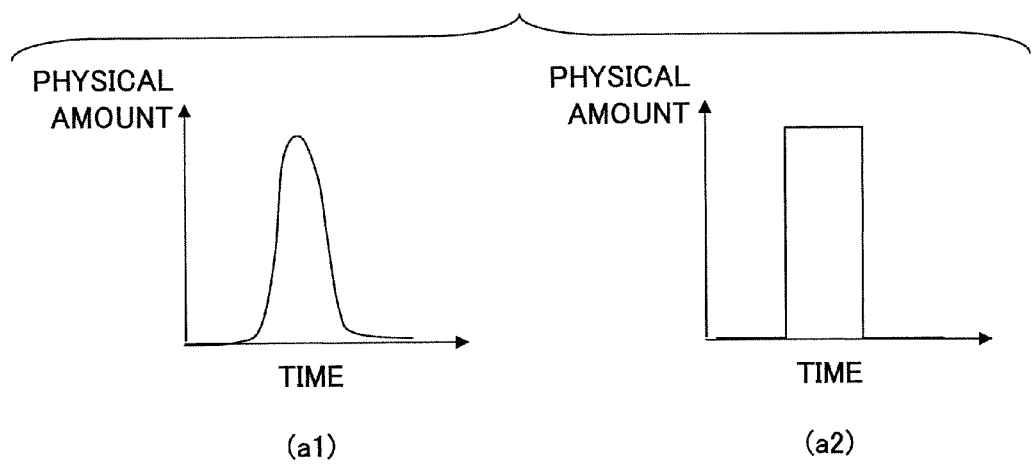
FIGS. 17A-17C are figures for explaining detected physical amounts and for explaining methods for determining presence or absence of similarity between changes of the physical amounts.
Figure 17B:
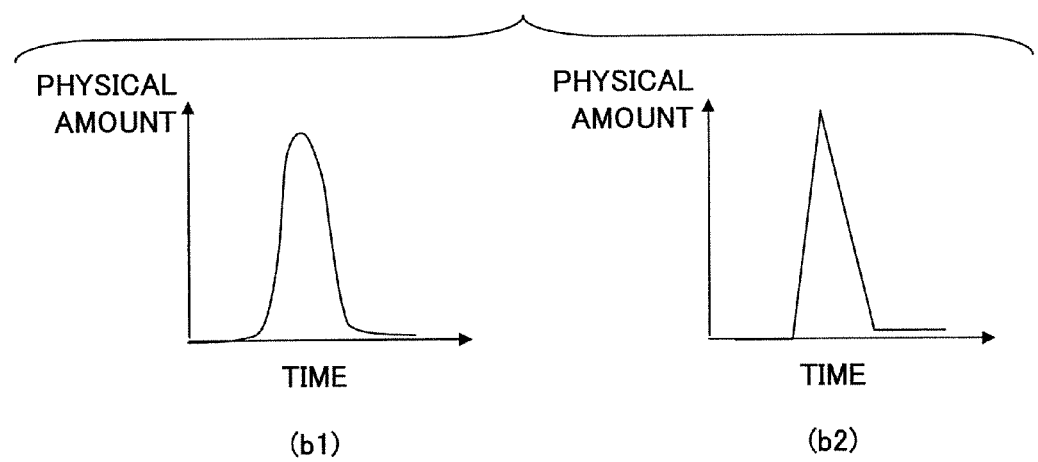
Figure 17C:
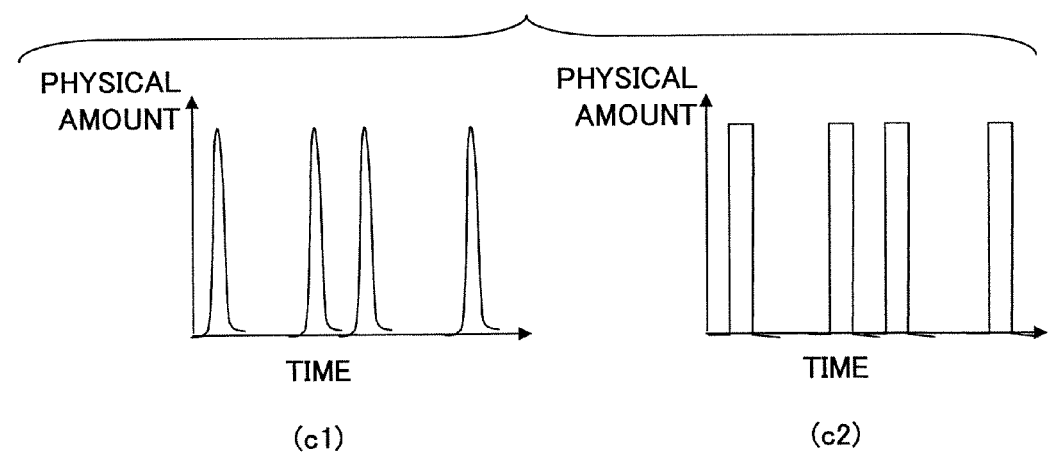

FIGS. 17A-17C are figures for explaining physical amounts detected by the communication establishment unit 600 connected to the apparatus 610 and physical amounts detected by the communication establishment unit 700 connected to the mobile terminal 710, and for explaining methods for determining presence or absence of similarity between changes of the physical amounts. FIGS. 17A-17C show output signals of a sensor in the physical amount detection unit. The sensor is an acceleration sensor, a pressure sensor, a strain gauge, a directional microphone, a light sensor, or a temperature sensor or the like. The detection unit 110 and the like in the communication establishment unit 600 or 700 is configured to be able to detect a physical amount that changes due to contact, further it is configured to cause physical amount changes related to contact with each other. The physical amount comparing unit of the apparatus 100 and the physical amount comparing unit of the mobile terminal 500 can be the same.

By the way, FIGS. 17A-17C show physical amounts detected when the communication establishment unit 600 and the communication establishment unit 700 contact. Instead, the physical amounts shown in FIGS. 17A-17C may be physical amounts detected when the apparatus 100 and the mobile terminal 500 contact.

FIG. 17A shows an example of output signals of the sensors in the communication establishment units 600 and 700 when the communication establishment unit 700 contacts the communication establishment unit 600. In "(a1)", an example of a signal detected by the communication establishment unit 600 is shown, and in "(a2)", an example of a signal detected by the communication establishment unit 700 is shown. For determination presence or absence of similarity of the signals between "(a1)" and "(a2)", the communication establishment unit uses a time width (half-width, for example) of a peak signal waveform of each signal, a time when an output level no less than a predetermined value is detected of each signal, or a function of a cross-correlation coefficient of each peak signal waveform.

It is not necessary that the physical amounts or the changes of the physical amounts detected by the physical amount detection units of the communication establishment units 600 and 700 are completely the same. The communication establishment unit applies a conversion coefficient of physical amount that is an evaluation function for evaluating the similarity with a same measure after calibrating the conversion coefficient according to configurations of each apparatus so as to determine presence or absence of the similarity.

FIG. 17B shows examples of signals of sensors of the communication establishment units 600 and 700 output when the communication establishment unit 700 contacts the communication establishment unit 600. The examples are different from examples shown in FIG. 17A. In "(b1)", an example of a signal detected by the communication establishment unit 600 is shown, and in "(b2)", an example of a signal detected by the communication establishment unit 700 is shown.

For determination presence or absence of similarity of the signals between "(b1)" and "(b2)", the communication establishment unit may compare times each corresponding to a peak value of the physical amount. In addition, the communication establishment unit may compare times each corresponding to a peak value of the physical amount after correcting the waveform in a time direction in consideration of delay of propagation of vibration due to contact.

FIG. 17C shows examples of signals of sensors of the communication establishment units 600 and 700 output when the communication establishment unit 700 contacts communication establishment unit 600. FIG. 17C shows a case where the operator contacts the communication establishment unit 700 with the communication establishment unit 600 a plurality of times. In "(c1)", an example of a signal detected by the communication establishment unit 600 is shown, and in "(c2)", an example of a signal detected by the communication establishment unit 700 is shown. FIG. 17C shows each waveform when the communication establishment units contact each other four times.

For determining presence or absence of similarity of the signals between "(c1)" and "(c2)", the communication establishment unit may compare the numbers of peaks detected within a predetermined time, for example. In addition, the similarity may be determined by comparing a number of times the physical amount exceeds a predetermined value with a number of times another physical amount exceeds a predetermined value. In addition, the similarity may be determined by comparing times each corresponding to a peak, further, the similarity may be determined based on a comparison result of the number of the peaks and a comparison result of times corresponding to peak value.

Accordingly, by using the number of peaks of changes of the physical amount due to contact of the apparatus, it becomes simplified to determine presence or absence of the similarity, so that reliability can be improved.

Third Embodiment

Each of FIGS. 18A and 18B shows an example of a data communications apparatus of an embodiment of the present invention. FIG. 18A shows an example including a physical amount generation unit. The apparatus 100b is connected to the mobile terminal 500b via the network or directly. Each of the apparatus 100b and the mobile terminal 500b detects contact based on changes of a physical amount of vibration and the like caused by the contact. In addition, the apparatus 100b generates a physical amount of a predetermined pattern, and the mobile terminal 500b requests the apparatus 100b to establish a communication based on the pattern of changes of the physical amount generated by the apparatus 100b.

The apparatus 100b shown in FIG. 18A includes a detection unit 110, a memory 120, a communication unit 150b, and a physical amount generation unit 170. The detection unit 110 and the memory 120 have the same function and configuration as those of units having the same reference symbols shown in FIG. 2.

When the detection unit 110 detects changes of the physical amount, that is, when contact of another apparatus is detected, the physical amount generation unit 170 generates a physical amount of the predetermined pattern.

The physical amount generation unit 170 may be configured, as a vibration source, to be a vibration unit including a small rotary motor in which a semicircular weight is provided at the axis of rotation of the motor, a piezoelectric actuator, an electrostatic actuator, or a conductive polymer actuator. In addition, the physical amount generation unit 170 may be configured, as a source of heat, to be a sheet heater that is a heater provided on a foil that is light in weight and thin and flexible, or a plate-like heater. In addition, the physical amount generation unit 170 may be configured, as a sound source, to be a dynamic speaker, a magnetic speaker, a condenser speaker (electrostatic type), or a piezoelectric speaker. Also, the physical amount generation unit 170 may be configured, as a light source, to be a light emitting element such as an LED (Light Emitting Diode), an EL (Electroluminescence), or a cold-cathode tube.

When the mobile terminal 500b detects the pattern of changes of the physical amount generated by the physical amount generation unit 170 so that establishment of a communication is requested by the mobile terminal 500b, the communication unit 150 establishes a communication in response to the request and performs the communication.

The mobile terminal 500b includes a detection unit 510b, a memory 520, a physical amount comparing unit 540b, and a communication unit 550b. The mobile terminal 500b may further include a pattern holding unit 570.

The detection unit 510b is a unit for detecting the changes of the physical amount generated by the physical amount generation unit 170 of the apparatus 100b. The detection unit 510b may detect changes of the physical amount caused by contact of the apparatus 100b so as to detect the changes of the physical amount generated by the physical amount generation unit 170 that follows the changes of the physical amount caused by the contact.

The physical amount comparing unit 540b is a unit for determining whether the changes of the physical amount detected by the detection unit 510b include the predetermined pattern. The predetermined pattern may be included in patterns held by the pattern holding unit 570, for example.

When the detection unit 510b detects the changes of the physical amount caused by contact with the apparatus 100b, the physical amount comparing unit 540 may compare changes of the physical amount detected by the apparatus 100b with changes of physical amount detected by the detection unit 510 based on a signal, received by the communication unit 550b, including the changes of the physical amount detected by the apparatus 100b. Accordingly, the apparatus can determine presence or absence of the similarity of the changes of the physical amounts. In addition, the apparatus can be configured to be able to perform processes based on the pattern of the changes of the physical amount generated by the apparatus 100b.

The pattern holding unit 570 is a unit for holding patterns of changes. By determining presence or absence of similarity between one of the patterns held in the pattern holding unit 570 and the pattern of changes detected by the detection unit 510b, the apparatus 100b can be identified, for example.

By the way, although FIGS. 18A and 18B show a case in which the apparatus 100b includes the physical amount generation unit 170 so that the mobile terminal 500b detects the changes of the physical amount generated by the physical amount generation unit 170, the present invention is not limited to the case shown in FIGS. 18A and 18B. A system of an embodiment of the present invention can be configured such that the mobile terminal 500b includes the physical amount generation unit so that the apparatus 100b detects the changes of the physical amount. In addition, an embodiment can be configured such that each of the apparatus 100b and the mobile terminal 500b includes the physical amount generation unit, and each of them detects changes of physical amount generated by another apparatus so that a communication is established. Accordingly, accuracy of identification of a data communications apparatus can be improved.

Figure 19A:
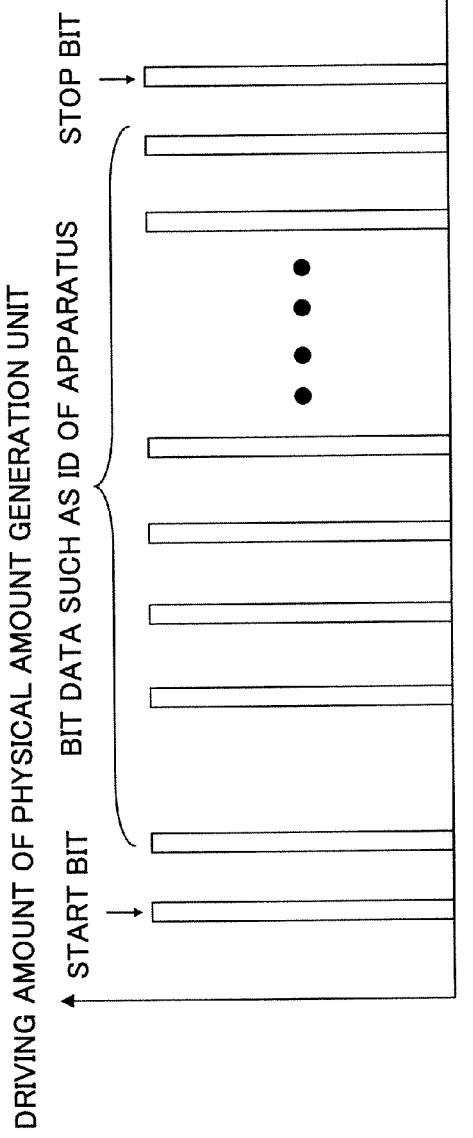
FIGS. 19A and 19B are figures for explaining a pattern of changes of a physical amount that is generated by the physical amount generation unit.
Figure 19B:
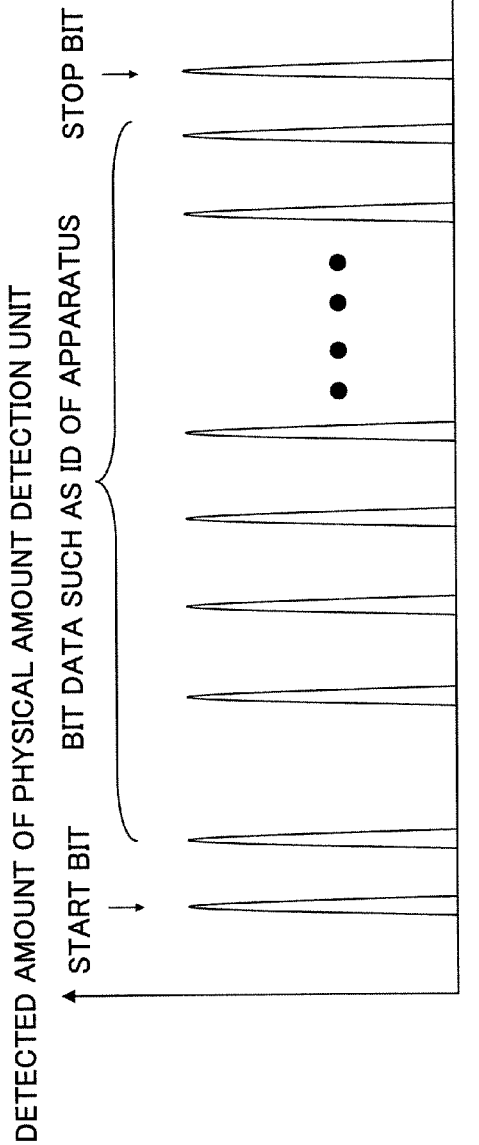

Each of FIGS. 19A and 19B is a figure for explaining a pattern of changes of a physical amount that is generated by the physical amount generation unit 170. FIG. 19A shows an example of the pattern of the changes of the physical amount that is generated by the physical amount generation unit 170 in which the pattern of the changes includes identification information of the apparatus 100b. In the case shown in FIG. 19A, the physical amount generation unit 170 generates the changes of the physical amount so as to generate a bit sequence of a variable length that includes a start bit and a stop bit each having 1 as the value, and includes bit data indicating identification information of the apparatus 100b between the start bit and the stop bit.

FIG. 19B shows an example of signals detected by the detection unit 510b that detects the pattern shown in FIG. 19B. By detecting the signals as shown in FIG. 19B, the identification information of the apparatus 100b arranged between the start bit and the stop bit can be obtained.

By the way, a parity bit can be added to the example shown in FIGS. 19A and 19B in an embodiment of the present invention.

FIG. 20 shows a data communications system of an embodiment of the present invention. In the system shown in FIG. 20, a communication is established by detecting a pattern of changes of the physical amount generated by a physical amount generation unit 70 provided in the outside of the apparatuses.

Each of the configurations of the apparatus 100c and the mobile terminal 500c is the same as corresponding one of the apparatus 100 and the mobile terminal 500 in FIG. 2. But, this example shown in FIG. 20 is different from that shown in FIG. 2 in that the physical amount detected by the detection unit 110 and the detection unit 510 is a physical amount generated by the physical amount generation unit 70 instead of the physical amount caused by contact between the apparatus 100c and the mobile terminal 500c. According to this configuration, changes of a physical amount can be generated stably since the changes are not dependent on strength of contact or a number of times of contacts.

By the way, in FIG. 20, each of the detection unit 110 and the detection unit 510 can be configured to detect the physical amount generated by the physical amount generation unit 70 in addition to detecting changes of the physical amount caused by contact between the apparatus 100c and the mobile terminal 500c.

In addition, each of the apparatus 100c and the mobile terminal 500c may include a unit for accessing a database including authentication information including waveforms of the physical amount generated by the physical amount generation unit 70, so that a waveform of a physical amount generated by the physical amount generation unit 70 can be used as a key for authentication. In this configuration, when waveform data included in the database is detected, a communication is established. Thus, it becomes possible to use the changes of the physical amount generated by the physical amount generation unit 70 as a key for authentication so that a securer communication environment can be constructed.

By the way, the database for including and managing the authentication information including waveforms may not be provided in the apparatus 100c or the mobile terminal 500c. For example, the database of the authentication information is provided and managed by a management server and the like so that each of the apparatus 100c and the mobile terminal 500c obtains the authentication information by communicating with the management server.

FIGS. 21A-21C show an example in which each of the apparatus 100d and the mobile terminal 500d includes an image pickup unit. In the configuration shown in FIGS. 21A-21C, each of the apparatus 100d and the mobile terminal 500d takes an image of a predetermined authentication key so that a communication is established between the apparatus 100d and the mobile terminal 500d.

The apparatus 100d shown in FIG. 21A includes a detection unit 110, a memory 120, a physical amount comparing unit 140d, a communication unit 150d, and an image pickup unit 180. The function and configuration of each of the detection unit 110 and the memory 120 are the same as those shown in FIG. 2.

When it is determined that another apparatus contacts the apparatus 100*d* by the detection unit 100 and the physical amount comparing unit 140, and when the apparatus 100*d* receives an instruction of operation for taking an image of the authentication key 80 by the operator from an input unit not shown in the figure, the image pickup unit 180 take an image of the authentication key 80.

The physical amount comparing unit 140*d* compares the changes of the physical amount detected by the detection unit 110 with the changes of the physical amount detected by another apparatus and received by the communication unit 150*d*, and, in addition to that, the physical amount comparing unit 140*d* determines whether the image data of the authentication key 80 taken by the image pickup unit 180 is predetermined data. Accordingly, authentication with another apparatus can be performed.

The mobile terminal 500*d* includes a detection unit 510, a memory 520, a physical amount comparing unit 540*d*, a communication unit 550*d*, and an image pickup unit 580. Each of units in the mobile terminal 500*d* has functions and configurations the same as those of corresponding one that has the same name in the apparatus 100*d*.

Figure 22:
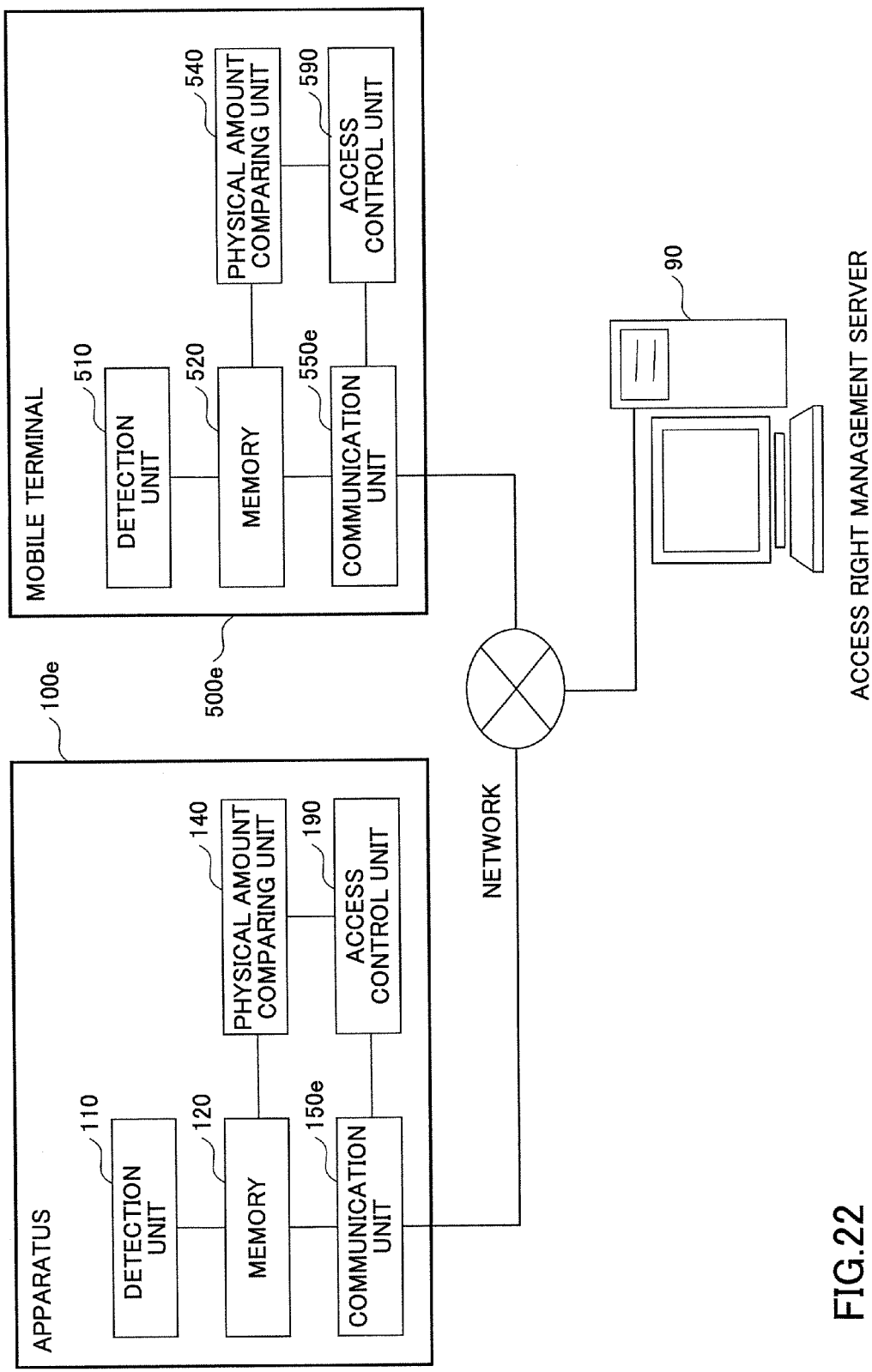
FIG. 22 shows an example of a functional configuration of a data communications system of an embodiment of the present invention in which access right management server is provided.

FIG. 22 shows an example of functional configurations of data communications apparatuses of an embodiment of the present invention. Also, FIG. 22 shows a data communications system for performing access control by communicating data with the access right management server. The apparatus 100*e* shown in FIG. 22 includes a detection unit 110, a memory 120, a physical amount comparing unit 140, a communication unit 150*e*, and an access control unit 190.

Each of the detection unit 110, the memory 120, the physical amount comparing unit 140, and the communication unit 150*e* has the same function and configuration as corresponding one having the same reference symbol in the apparatus 100 shown in FIG. 2.

When it is determined that another apparatus contacts the apparatus 100 by the physical amount comparing unit 140 and the like, the access control unit 190 establishes a communication and/or performs access control based on the access right information from the access right management server.

The mobile terminal 500*e* includes a detection unit 510, a memory 520, a physical amount comparing unit 540, a communication unit 550, and an access control unit 590. Each unit in the mobile terminal 500*e* has the function and configuration the same as those of corresponding one that has the same name in the apparatus 100*e*.

FIG. 23 shows another example of functional configurations of data communications apparatuses of an embodiment of the present invention. In the configuration shown in FIG. 23, a communication is established based on contact between the apparatus 100*f* and the mobile terminal 500*f*, for example.

The apparatus 100*f* in FIG. 23 includes a communication unit 150, a communication establishment unit 151, a contact detection unit 111, and a physical amount generation unit 170, for example. The apparatus 100*f* may further includes one or more of an image pickup unit 180, a job execution unit 160, a job data send and receive unit 161 and an authentication unit 191.

The contact detection unit 111 is a unit for detecting that another apparatus contacts the apparatus 100, and has the function and configuration the same as those of the physical amount detection unit of the communication establishment unit described with reference to FIGS. 11A-16B.

When the contact detection unit 111 detects contact of another apparatus, the physical amount generation unit 170 changes a physical amount of the apparatus 100*f* with a predetermined pattern. For example, identification information of the apparatus 100*f* may be superimposed into the pattern generated by the physical amount generation unit 170.

The communication unit 150 is a unit for communicating with another apparatus such as the mobile terminal 500*f* or a server via a network or directly. The communication unit 150 may include a function for performing a pre-communication when establishing a wireless communication. In addition, the communication unit 150 may communicate with an access right management server 90 that holds access right information for controlling accesses of other apparatuses so as to obtain information related to access right.

The communication establishment unit 151 is a unit for establishing a communication with another apparatus such as the mobile terminal 500*f*. The communication establishment unit 151 establishes a communication with another apparatus authenticated by the authentication unit 191, for example. In addition, the communication establishment unit 151 may establish a communication in response to a request for establishing a communication from the mobile terminal 500*f* based on detecting a pattern of changes of the physical amount generated by the physical amount generation unit 170.

The image pickup unit 180 is a unit for taking an image of the authentication key 80 and the like for performing authentication. For example, the image pickup unit 180 may take an image when contact with another apparatus is detected by the contact detection unit 111 and the operator instructs to take the image using an input unit not shown in the figure.

The authentication unit 191 is a unit for performing authentication of another apparatus that the apparatus 100*f* attempts to establish a communication with. For example, the authentication unit 191 performs the authentication based on image data taken by the image pickup unit 180 or based on authentication information obtained by the communication unit 150 or the like.

The job execution unit 160 is a unit for executing a job of the apparatus 100*f*. The job data send and receive unit 161 is a unit for sending and receiving data used for executing the job or an instruction of the job or the like.

The mobile terminal 500*f* includes a communication unit 550, a communication establishment unit 551, a contact detection unit 511, a physical amount detection unit 512, and a physical amount comparing unit 540. The mobile terminal 500*f* may further include one or more or an image pickup unit 580, a job execution unit 560, a job data send and receive unit 561, and an authentication unit 591.

Each of the contact detection unit 511, the image pickup unit 580, the job execution unit 560, and a job data send and receive unit 561 has the function and configuration as the same as those of corresponding one that has the same name of the apparatus 100*f*. By the way, instead of using the contact detection unit 511, the same function can be realized using the physical amount detection unit 512 and the physical amount comparing unit 540.

The physical amount detection unit 512 is a unit for detecting changes of physical amount detected by the physical amount generation unit 170 of the apparatus 100*f* or generated by an external physical amount generation unit 70. The physical amount detection unit 512 detects a pattern of changes of the physical amount.

The physical amount comparing unit 540 is a unit for determining whether there is similarity between the pattern of the changes of the physical amount detected by the physical amount detection unit 512 and a predetermined pattern. The physical amount comparing unit 540 may obtain the predetermined pattern from a pattern holding unit and the like not shown in the figure to compare the predetermined pattern with the pattern of the changes of the physical amount detected by the physical amount detection unit 512. The physical amount comparing unit 540 may obtain the predetermined pattern from a server via the communication unit 550.

The authentication unit 591 is a unit for performing authentication for another apparatus that contacts the mobile terminal 500*f* based on image data taken by the image pickup unit 580, information obtained from a server and the like by the communication unit 550, or identification information superimposed as modulation wave onto the pattern of the changes of the physical amount obtained by the physical amount detection unit 512.

The communication unit 550 is a unit for establishing a communication with another apparatus via a network or directly, and may include a function for performing a pre-communication when establishing a wireless communication. In addition, the communication unit 550 may communicate with the access right management server 90 holding access right information for controlling access of another apparatus for connection so as to obtain information related to access right.

The communication establishment unit 551 is a unit for establishing a communication with another apparatus such as the apparatus 100*f*. The communication establishment unit 551 establishes a communication with another apparatus authenticated by the authentication unit 591, for example. In addition, the communication establishment unit 551 may establish a communication with the apparatus 100*f* by obtaining the pattern of the changes of the physical amount generated by the physical amount generation unit 170 of the apparatus 100*f*.

The access right management server 90 is a server holding information related to access right of a plurality of apparatuses including the apparatus 100*f* and the mobile terminal 500*f*. The function and configuration of the physical amount generation unit 70 are the same as those of the corresponding unit having the same reference symbol shown in FIG. 20, and the function and configuration of the authentication key 80 are the same as those of the corresponding unit having the same reference symbol shown in FIG. 21.

The present invention is not limited to the specifically disclosed embodiments, and variations and modifications may be made without departing from the scope of the present invention.

The present application contains subject matter related to Japanese patent application No. 2006-305430, filed in the JPO on Nov. 10, 2006, and Japanese patent application No. 2006-17797, filed in the JPO on Jan. 26, 2006, the entire contents of which are incorporated herein by reference.

What is claimed is:

1. A data communications apparatus for communicating with another apparatus, comprising:
   a physical amount detection unit configured to detect changes of a first physical amount caused by contacting the another apparatus;
   a physical amount receiving unit configured to receive a signal including change information of a second physical amount of the another apparatus detected in the another apparatus when the first physical amount detected by the physical amount detection unit exceeds a predetermined value;
   a physical amount comparing unit configured to compare the changes of the first physical amount detected by the physical amount detection unit with the changes of the second physical amount detected by the another apparatus to determine presence or absence of similarity; and
   a communication establishment unit configured to establish a communication with the another apparatus when the physical amount comparing unit determines that there is a similarity between the changes of the first physical amount and the changes of the second physical amount.

2. The data communications apparatus as claimed in claim 1, wherein the physical amount detection unit detects an angular velocity of vibration caused by contact with the another apparatus, or detects an acceleration of the vibration.

3. The data communications apparatus as claimed in claim 1, wherein the physical amount detection unit detects a deformation amount, a pressure or a temperature at a contact part where the data communications apparatus contacts the another apparatus.

4. The data communications apparatus as claimed in claim 1, wherein the physical amount detection unit detects a sound pressure caused by contact with the another apparatus.

5. The data communications apparatus as claimed in claim 1, the physical detection unit including a light amount detection unit configured to detect a light amount in a predetermined area of a surface of the data communications apparatus, wherein the light amount detection unit detects changes of the light amount caused by contact with the another apparatus.

6. The data communications apparatus as claimed in claim 1, wherein the physical amount comparing unit corrects the amounts in a time direction when comparing the changes of the first physical amount with the changes the second physical amount.

7. The data communications apparatus as claimed in claim 1, wherein the physical amount comparing unit determines presence or absence of the similarity by comparing a first number of times the first physical amount exceeds a predetermined value with a second number of times the second physical amount exceeds a predetermined value.

8. The data communications apparatus as claimed in claim 1, the data communications apparatus further comprising:
   a sending unit configured to send a signal including change information of the first physical amount when the first physical amount detected by the physical amount detection unit exceeds a predetermined value,
   wherein the communication establishment unit establishes a communication with the another apparatus when the another apparatus requests establishment of the communication.

9. The data communications apparatus as claimed in claim 1, the data communications apparatus further comprising:
   a contact detection unit configured to detect contact with the another apparatus;
   a physical amount changing unit configured to change a predetermined physical amount of the data communications apparatus according to a predetermined pattern when the contact detection unit detects contact with the another apparatus,
   wherein the communication establishment unit establishes a communication with the another apparatus when the another apparatus that detects changes of the predetermined physical amount requests establishment of the communication.

10. The data communications apparatus as claimed in claim 1, the data communications apparatus further comprising:
    a contact detection unit configured to detect contact with the another apparatus;

a detection unit configured to detect changes of a physical amount generated by the another apparatus when the contact detection unit detects contact with the another apparatus; and a physical amount determination unit configured to determine whether the changes of the physical amount generated by the another apparatus include a predetermined pattern, wherein the communication establishment unit establishes a communication with the another apparatus when the physical amount determination unit determines that the changes of the physical amount generated by the another apparatus include the predetermined pattern.

11. The data communications apparatus as claimed in claim 9, wherein the predetermined patter of the changes of the physical amount includes identification information of the apparatus that generates the changes of the physical amount.

12. The data communications apparatus as claimed in claim 1, the data communications apparatus further comprising a job execution unit configured to execute a job designated by the another apparatus when the communication is established and/or a job data send and receive unit configured to start sending and receiving data associated with execution of the job when the communication is established.

13. The data communications apparatus as claimed in claim 1, the data communications apparatus further comprising an image pickup unit configured to take a predetermined image included in the another apparatus, wherein the communication establishment unit establishes the communication based on the predetermined image taken by the image pickup unit.

14. A data communications system including a first data communications apparatus and a second data communications apparatus that communicate with each other, the first data communications apparatus comprising:

a detection unit configured to detect changes of a first physical amount caused by contact with the second data communications apparatus;

a physical amount receiving unit configured to receive a signal including change information of a second physical amount of the second communications apparatus detected in the second communications apparatus when the first physical amount detected by the detection unit exceeds a predetermined value;

a physical amount comparing unit configured to compare the changes of the first physical amount detected by the detection unit with the changes of the second physical amount received by the physical amount receiving unit to determine presence or absence of similarity; and a communication establishment unit configured to establish a communication with the second data communications apparatus when the physical amount comparing unit determines that there is a similarity between the changes of the first physical amount and the changes of the second physical amount, the second data communications apparatus comprising:

a detection unit configured to detect the changes of the second physical amount caused by contact with the first data communications apparatus;

a sending unit configured to send a signal including the change information of the second physical amount when the second physical amount exceeds a predetermined value; and a communication establishment unit configured to establish a communication with the first data communications apparatus when the first data communications apparatus requests establishment of a communication based on the changes of the second physical amount.

15. The data communications system as claimed in claim 14, the first data communications apparatus further comprising:

a contact detection unit configured to detect contact with the second data communications apparatus; and a physical amount changing unit configured to change a predetermined physical amount of the first data communications apparatus according to a predetermined pattern when the contact detection unit detects contact with the second data communications apparatus, wherein the communication establishment unit of the first data communications apparatus establishes a communication with the second data communications apparatus when the second data communications apparatus that detects the changes of the predetermined physical amount changed by the physical amount changing unit requests establishment of the communication, the second communications apparatus further comprising:

a contact detection unit configured to detect contact with the first data communications apparatus;

a detection unit configured to detect changes of the predetermined physical amount of the first data communications apparatus when the contact detection unit detects contact with the first data communications apparatus; and a physical amount determination unit configured to determine whether the changes of the predetermined physical amount include the predetermined pattern, wherein the communication establishment unit of the second data communications unit establishes a communication with the first communications apparatus when the physical amount determination unit determines that the changes of the predetermined physical amount include the predetermined pattern.

16. A data communications method in a data communications apparatus for communicating with another apparatus, comprising:

a physical amount detection step of detecting changes of a first physical amount caused by contacting the another apparatus;

a physical amount receiving step of receiving a signal including change information of a second physical amount of the another apparatus detected in the another apparatus when the first physical amount detected in the physical amount detection step exceeds a predetermined value;

a physical amount comparing step of comparing the changes of the first physical amount detected in the physical amount detection step with the changes of the second physical amount received in the physical amount receiving step to determine presence or absence of similarity;

a communication establishing step of establishing a communication with the another apparatus when it is determined that there is a similarity between the changes of the first physical amount and the changes of the second physical amount in the physical amount comparing step.

17. The data communications method as claimed in claim 16, the data communications apparatus determines presence or absence of the similarity by comparing a first number of times the first physical amount exceeds a predetermined value with a second number of times the second physical amount exceeds a predetermined value.

18. The data communications method as claimed in claim 16, the data communications method further comprising:

a sending step of sending a signal including change information of the first physical amount when the first physical amount detected in the physical amount detection step exceeds a predetermined value, wherein the data communications apparatus establishes a communication with the another apparatus when the another apparatus requests establishment of the communication based on the changes of the first physical amount.

19. The data communications method as claimed in claim 16, the data communications method further comprising:

a contact detection step of detecting contact with the another apparatus;

a physical amount changing step of changing a predetermined physical amount of the data communications apparatus when contact with the another apparatus is detected; and a communication establishing step of establishing a communication with the another apparatus when the another apparatus that detects changes of the predetermined physical amount requests establishment of the communication.

20. The data communications method as claimed in claim 16, the data communications method further comprising:

a contact detection step of detecting contact with the another apparatus;

a physical amount detection step of detecting changes of a predetermined physical amount of the another apparatus generated by the another apparatus when contact with the another apparatus is detected;

a physical amount determination step of determining whether the changes of the predetermined physical amount generated by the another apparatus include a predetermined pattern; and a communication establishing step of establishing a communication with the another apparatus when it is determined that the changes of the predetermined physical amount generated by the another apparatus include the predetermined pattern in the physical amount determination step.

* * * * *